United States Patent
Hirokawa

(10) Patent No.: US 12,500,516 B2
(45) Date of Patent: Dec. 16, 2025

(54) SWITCHING POWER SUPPLY APPARATUS AND ELECTRIC POWER SUPPLY SYSTEM

(71) Applicant: TDK CORPORATION, Tokyo (JP)

(72) Inventor: Masahiko Hirokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 205 days.

(21) Appl. No.: 18/283,022

(22) PCT Filed: Mar. 25, 2021

(86) PCT No.: PCT/JP2021/012621
§ 371 (c)(1),
(2) Date: Sep. 20, 2023

(87) PCT Pub. No.: WO2022/201448
PCT Pub. Date: Sep. 29, 2022

(65) Prior Publication Data
US 2024/0171080 A1    May 23, 2024

(51) Int. Cl.
*H02M 3/335*    (2006.01)
*H02M 1/00*    (2006.01)
*H02M 3/00*    (2006.01)

(52) U.S. Cl.
CPC ........... *H02M 3/01* (2021.05); *H02M 1/0009* (2021.05); *H02M 3/33571* (2021.05)

(58) Field of Classification Search
CPC ...... H02M 3/01; H02M 3/335; H02M 3/3353; H02M 3/33569; H02M 3/33571; H02M 3/33576; H02M 3/33592; H02M 1/0009
See application file for complete search history.

(56) References Cited

U.S. PATENT DOCUMENTS

| | | |
|---|---|---|
| 9,564,826 B2 | 2/2017 | Sugahara et al. |
| 10,326,377 B1 * | 6/2019 | Xiong ............ H05B 45/14 |
| 2013/0099787 A1 * | 4/2013 | Lu ............ H02M 3/3376 324/319 |
| 2018/0248489 A1 * | 8/2018 | Wang ............ H02M 7/217 |

FOREIGN PATENT DOCUMENTS

JP    6323258 B2    5/2018

* cited by examiner

*Primary Examiner* — Gary L Laxton
(74) *Attorney, Agent, or Firm* — Oliff PLC

(57) ABSTRACT

A switching power supply apparatus includes a pair of input terminals, a pair of output terminals, a transformer, an inverter circuit, a rectifying and smoothing circuit, and a controller. The inverter circuit includes first and second switching devices, a resonant inductor, and a resonant capacitor. The controller controls a switching operation of each of the first and second switching devices. The first and second switching devices are coupled in series to each other between a pair of coupling lines. The resonant inductor, the resonant capacitor, and a primary winding are coupled in series to each other in no particular order between a node between the first and second switching devices, and one of the pair of input terminals. The controller controls the switching operation on the basis of a voltage across the resonant capacitor and a voltage across the primary winding.

15 Claims, 15 Drawing Sheets

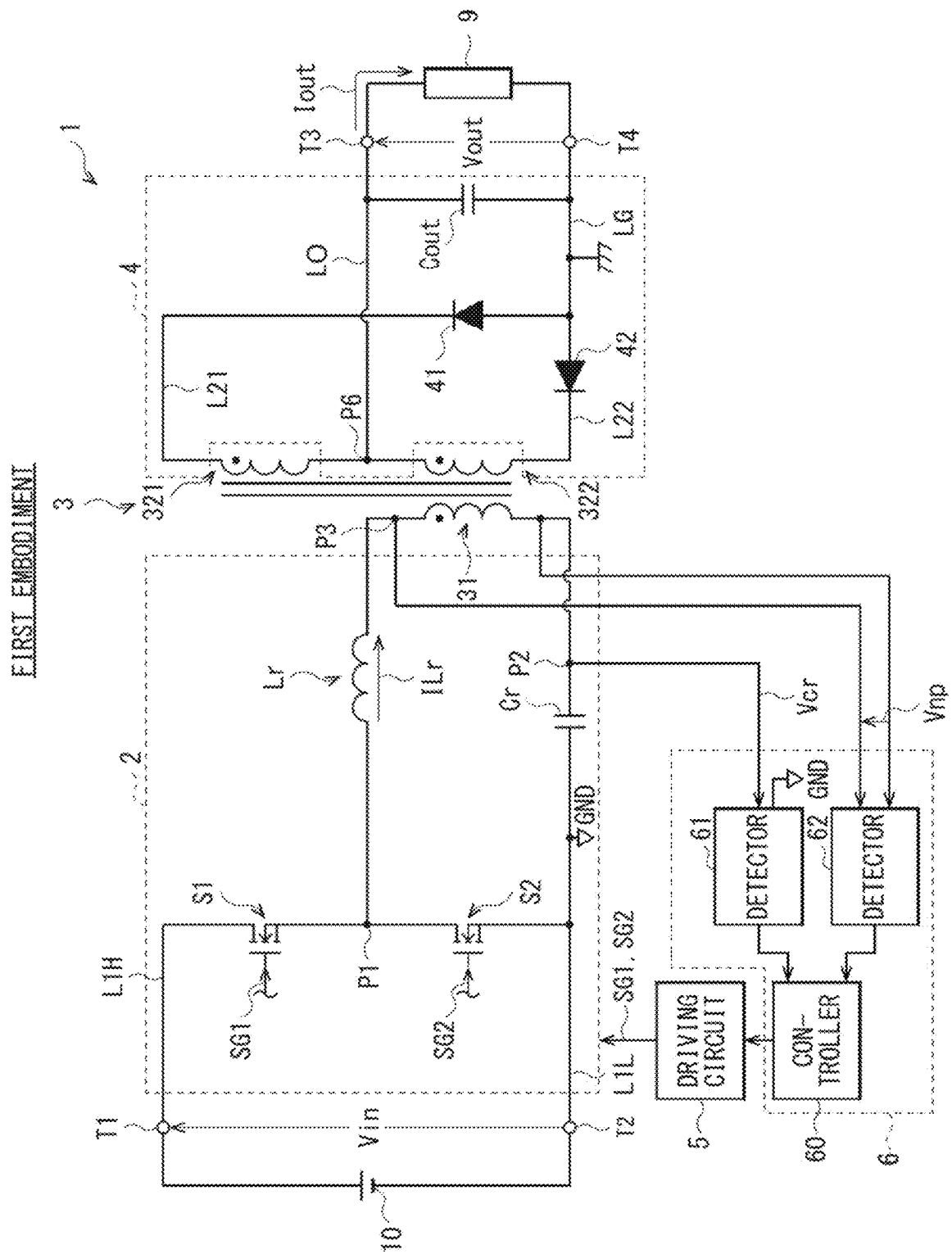
[FIG. 1]

[ FIG. 2 ]
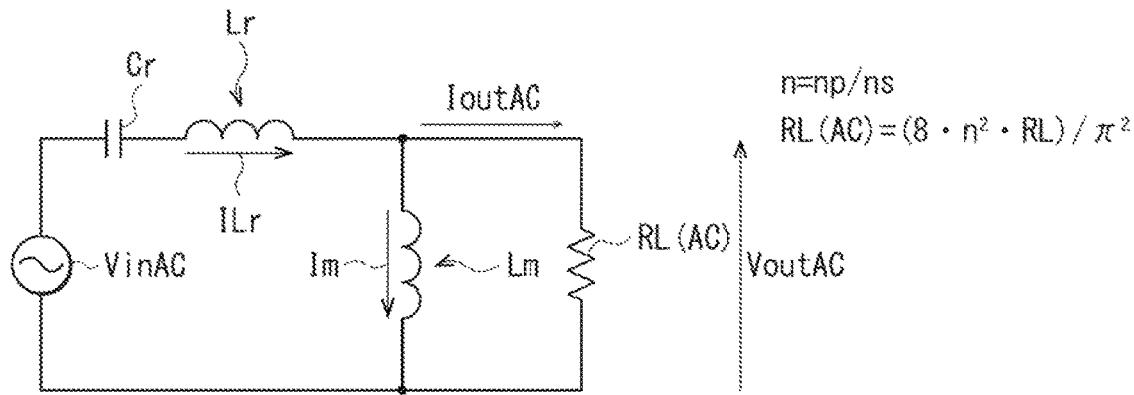
[ FIG. 3 ]
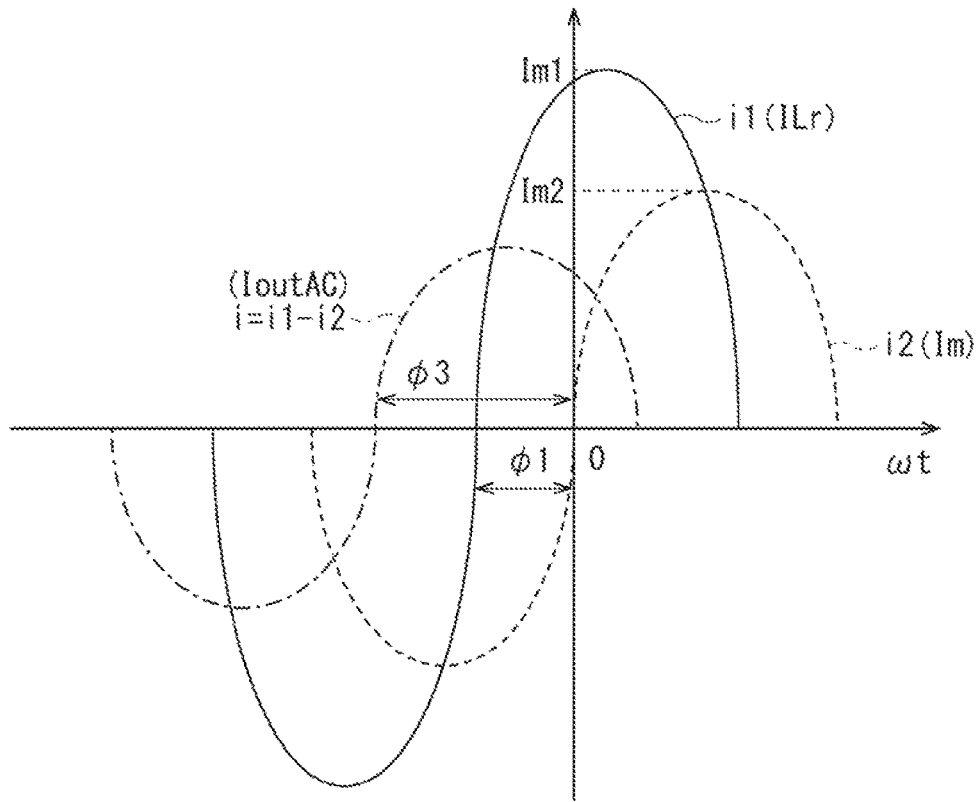

[FIG. 4]
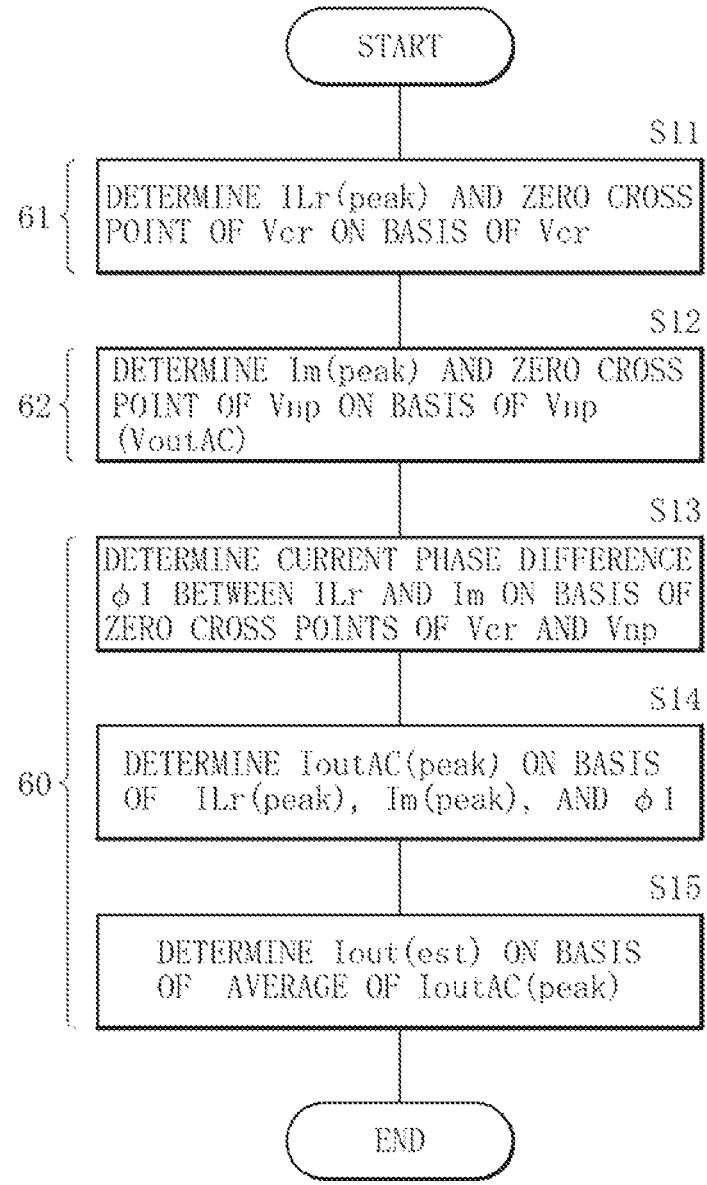

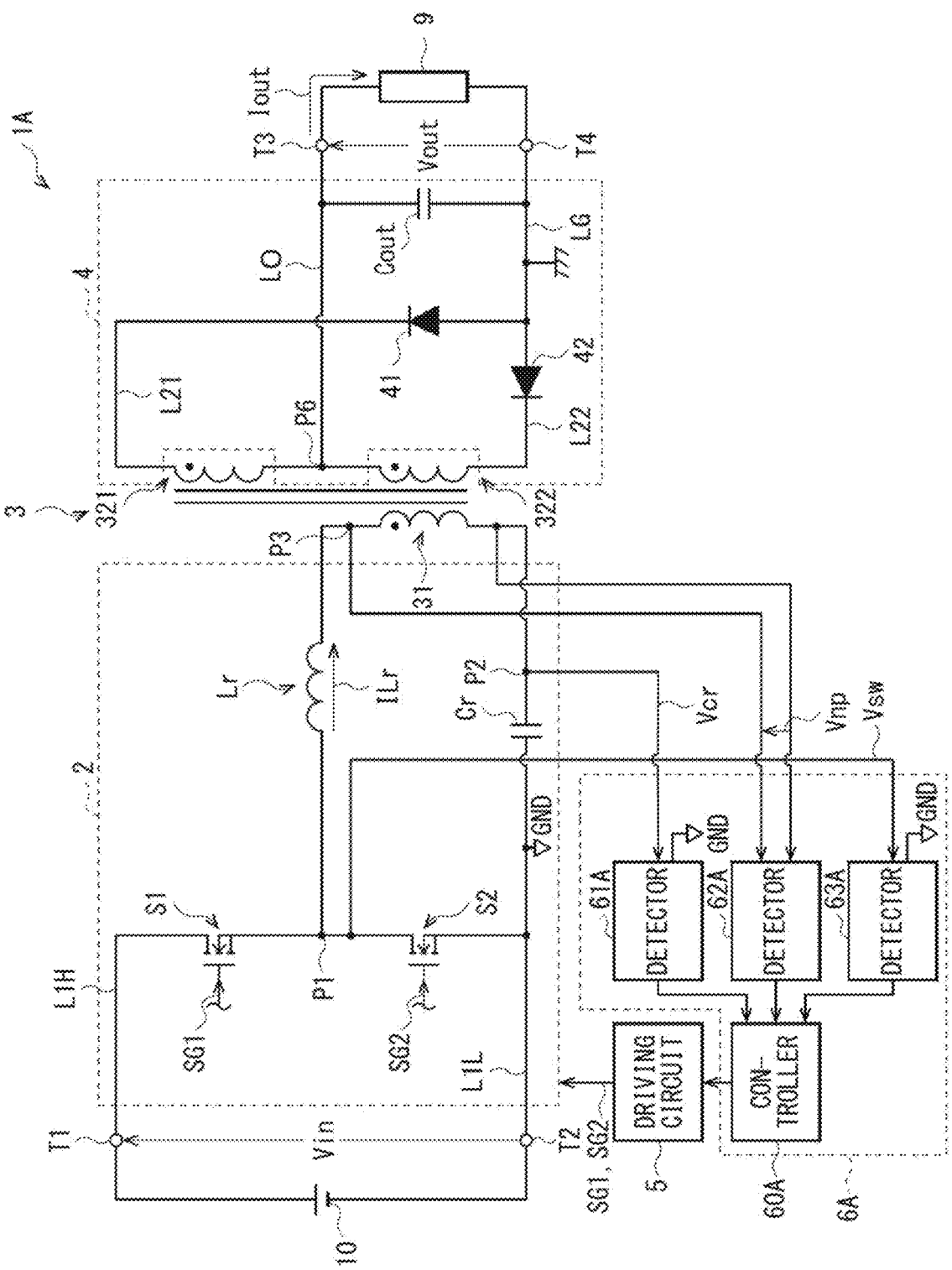
[FIG. 5]

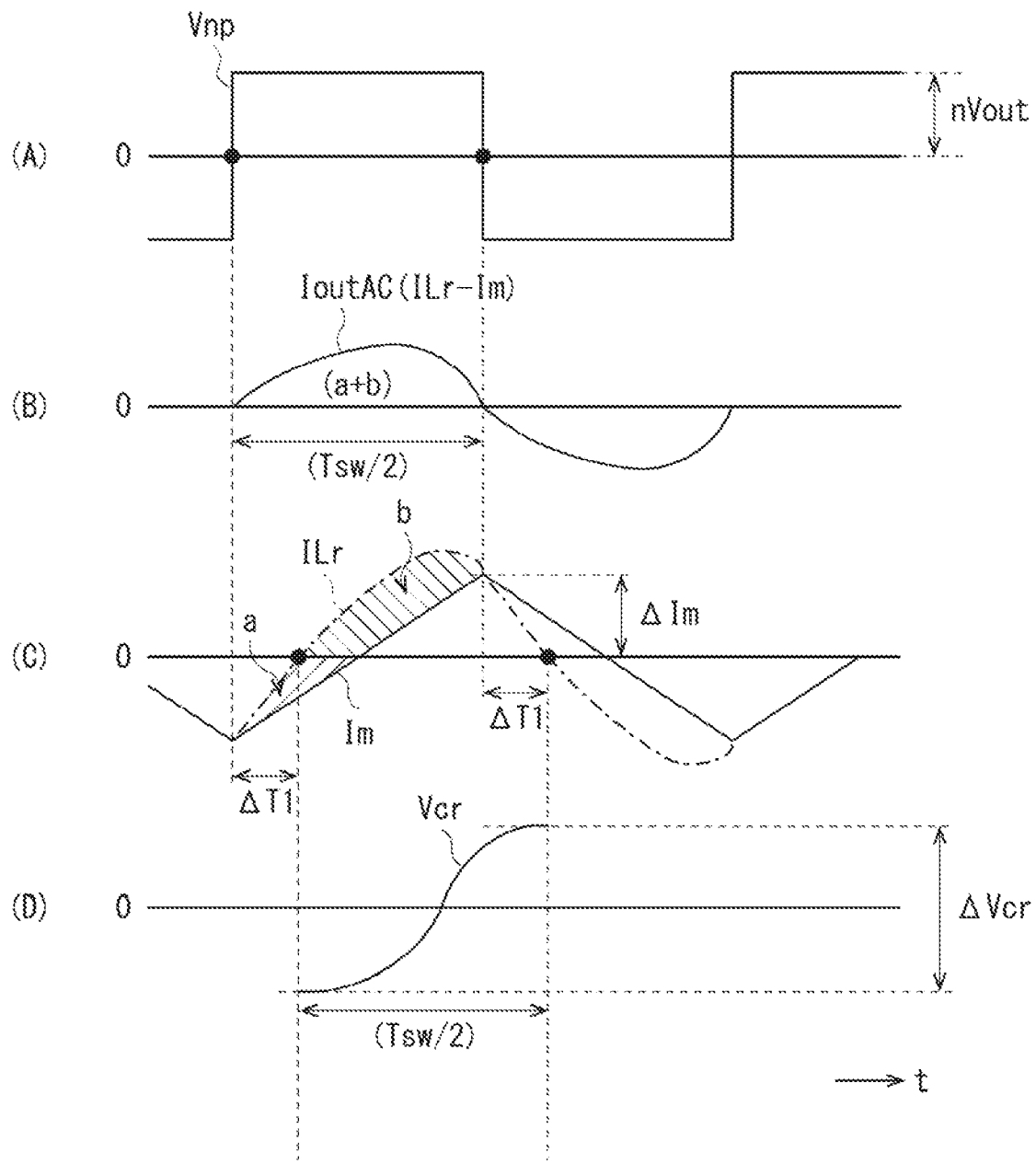

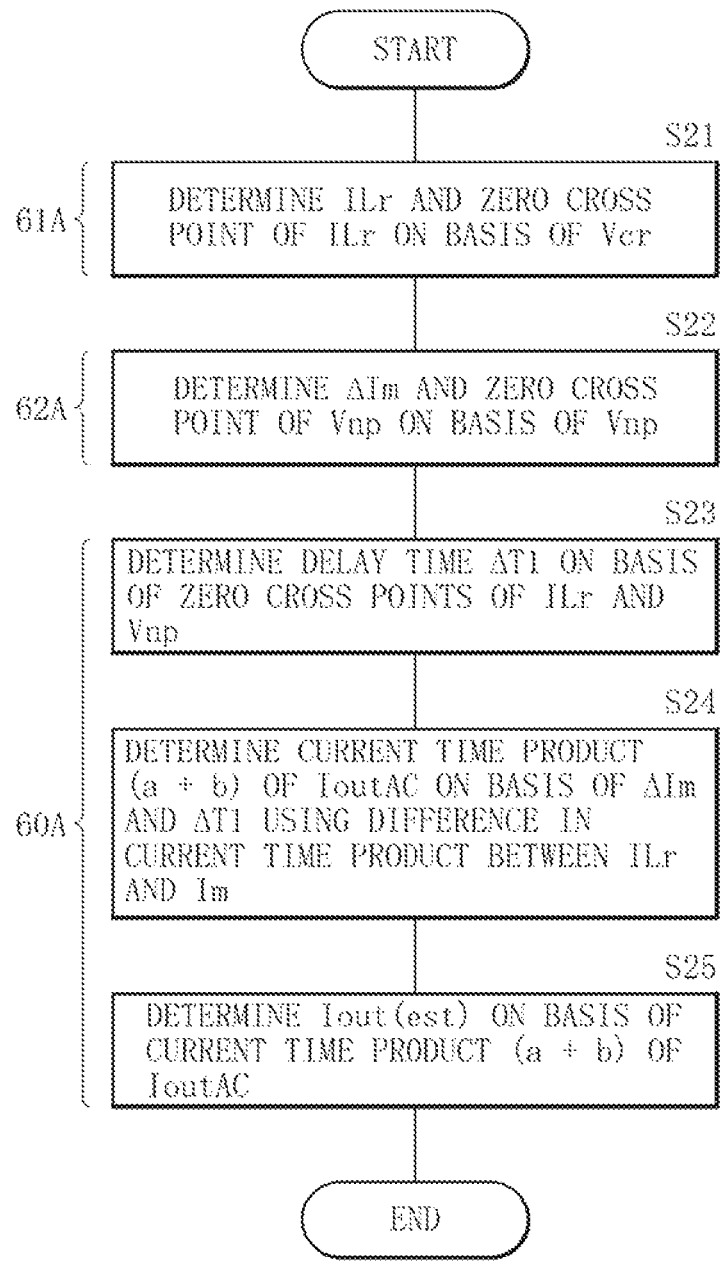

[FIG. 8]
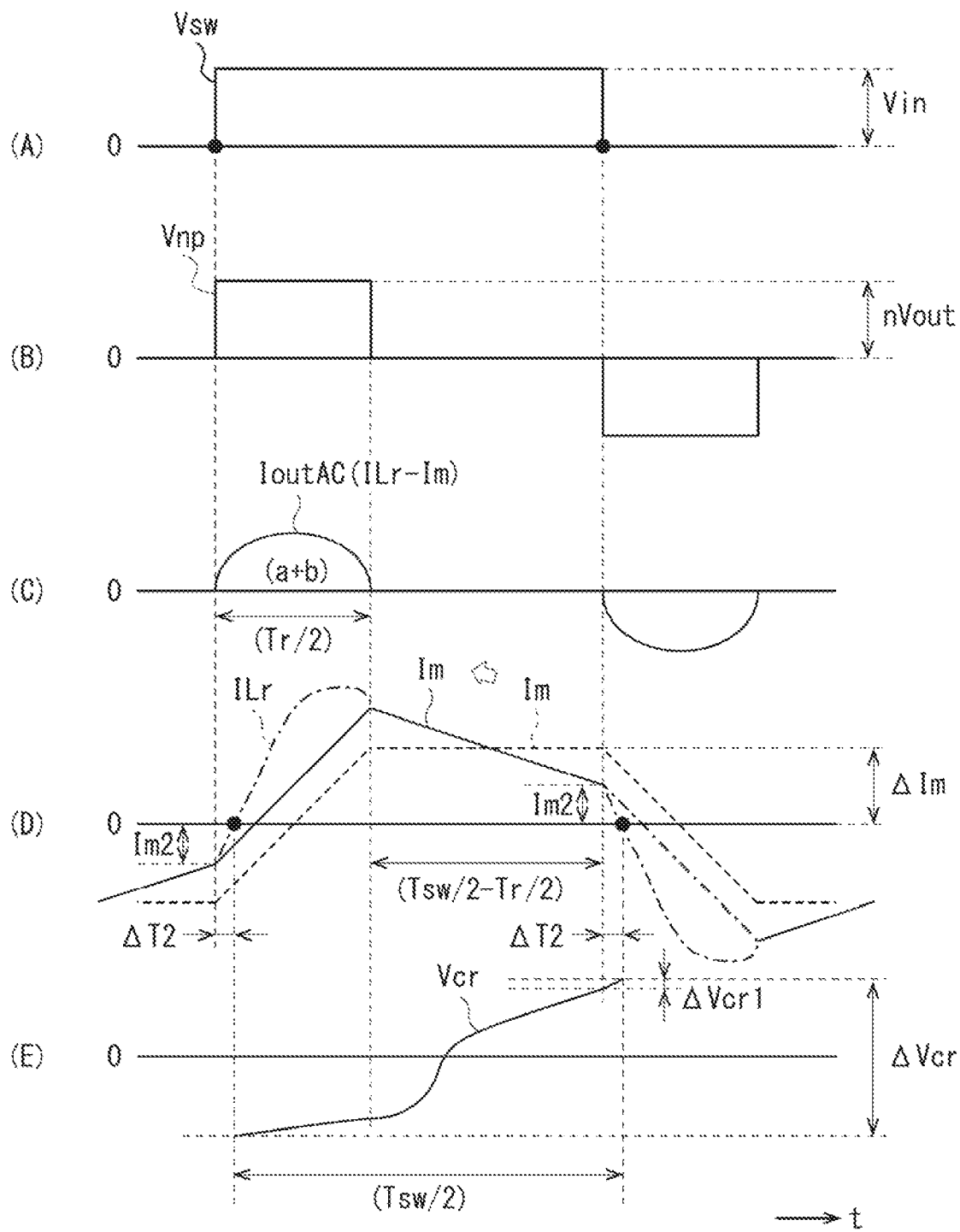

[FIG. 9]
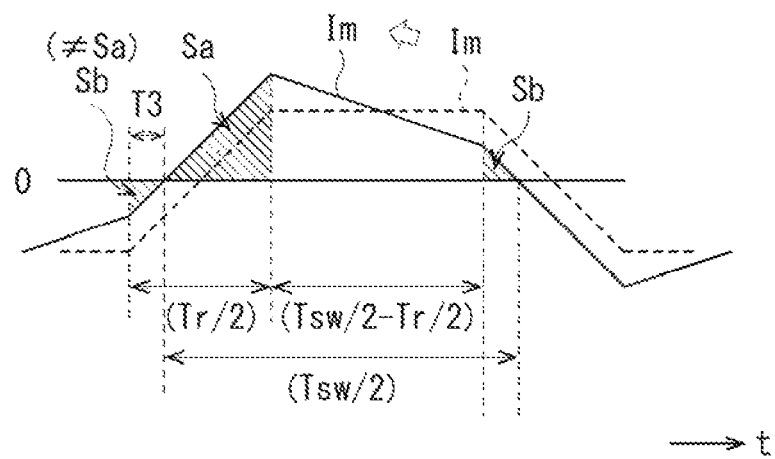

[ FIG. 10 ]
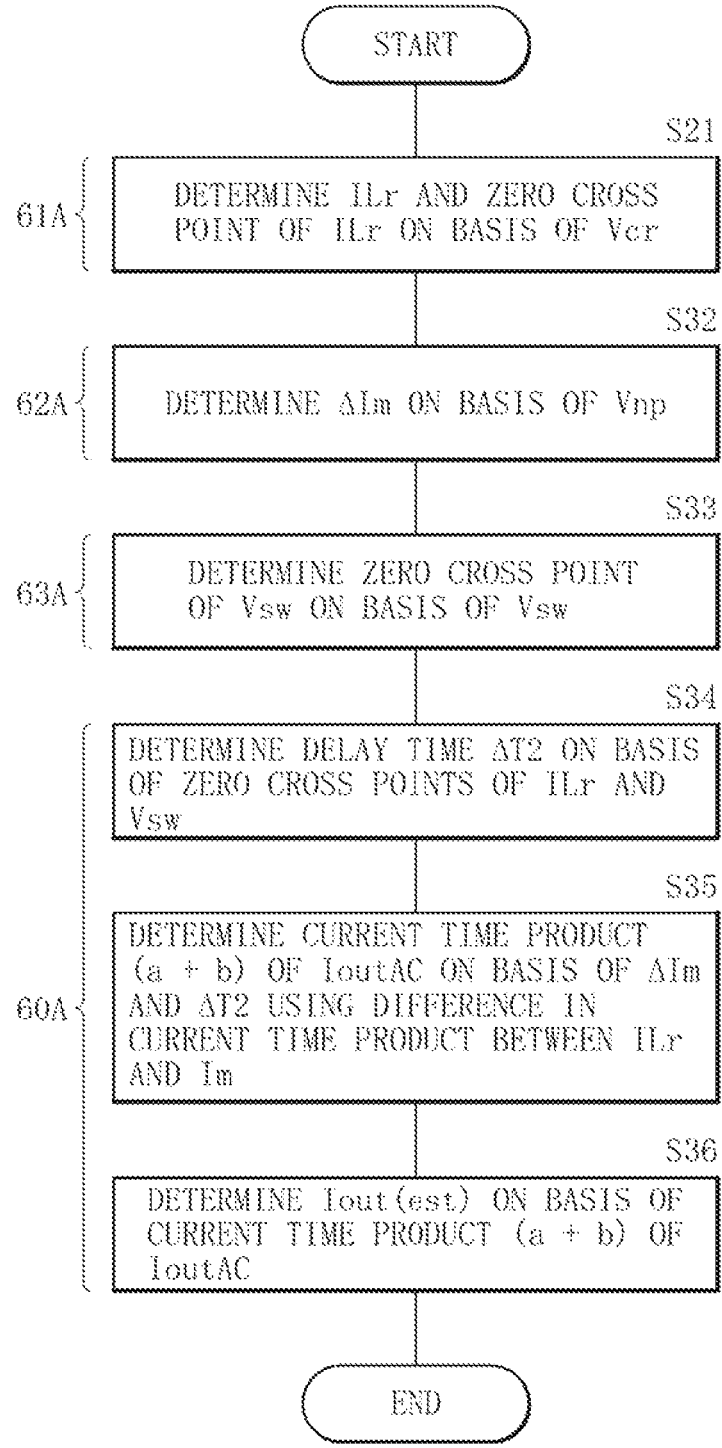

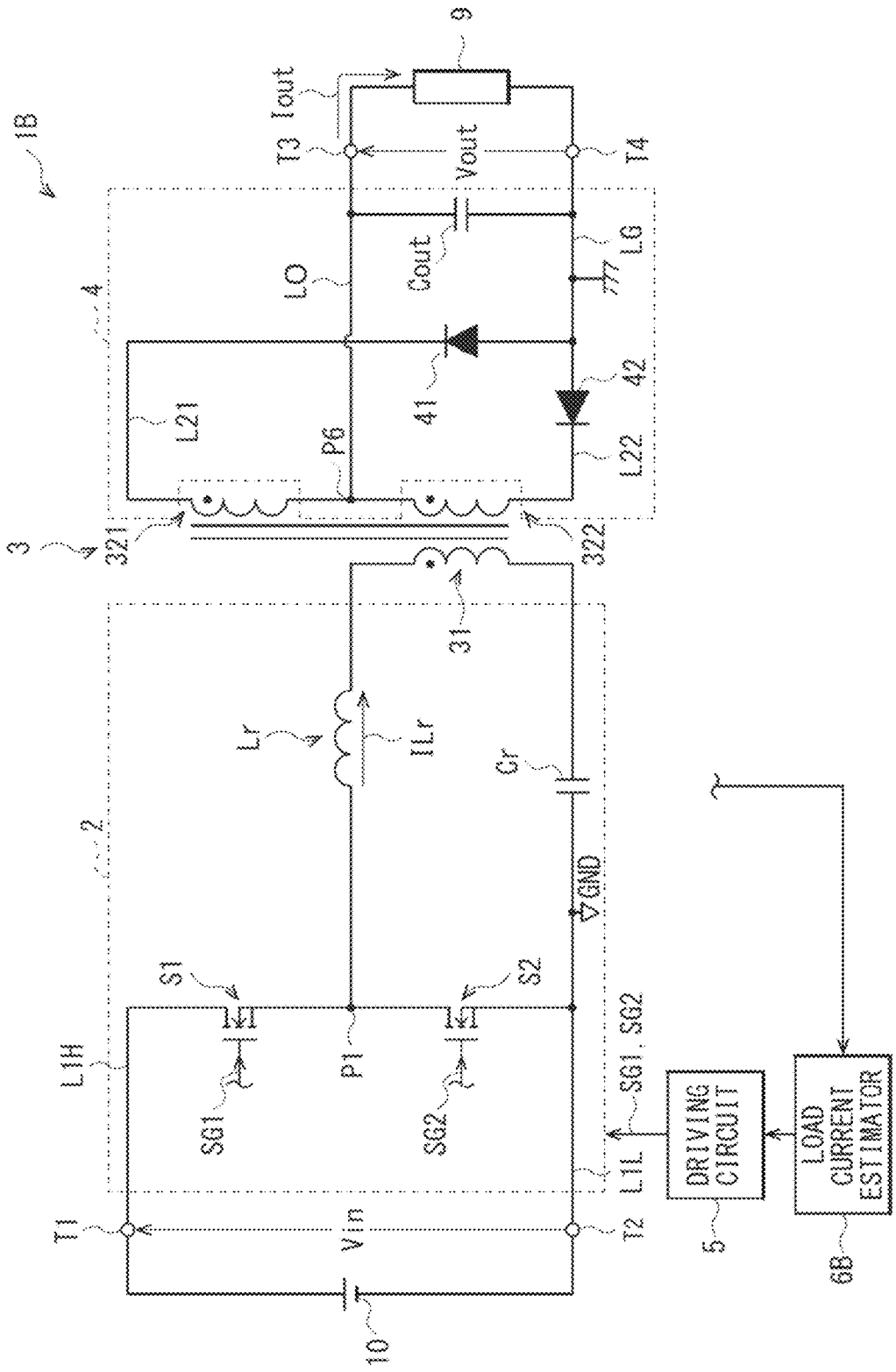
[FIG. 11]

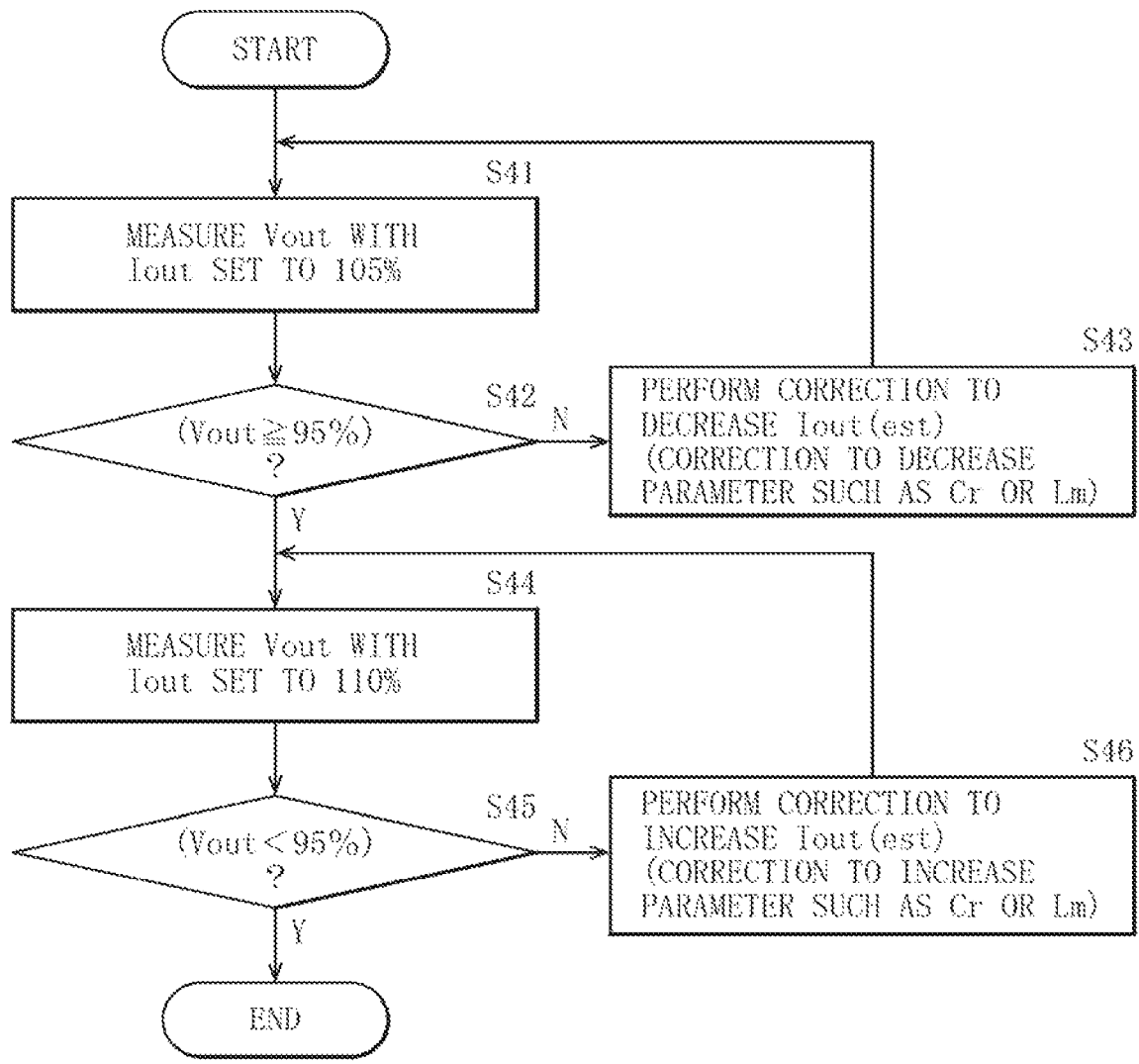

[ FIG. 13 ]
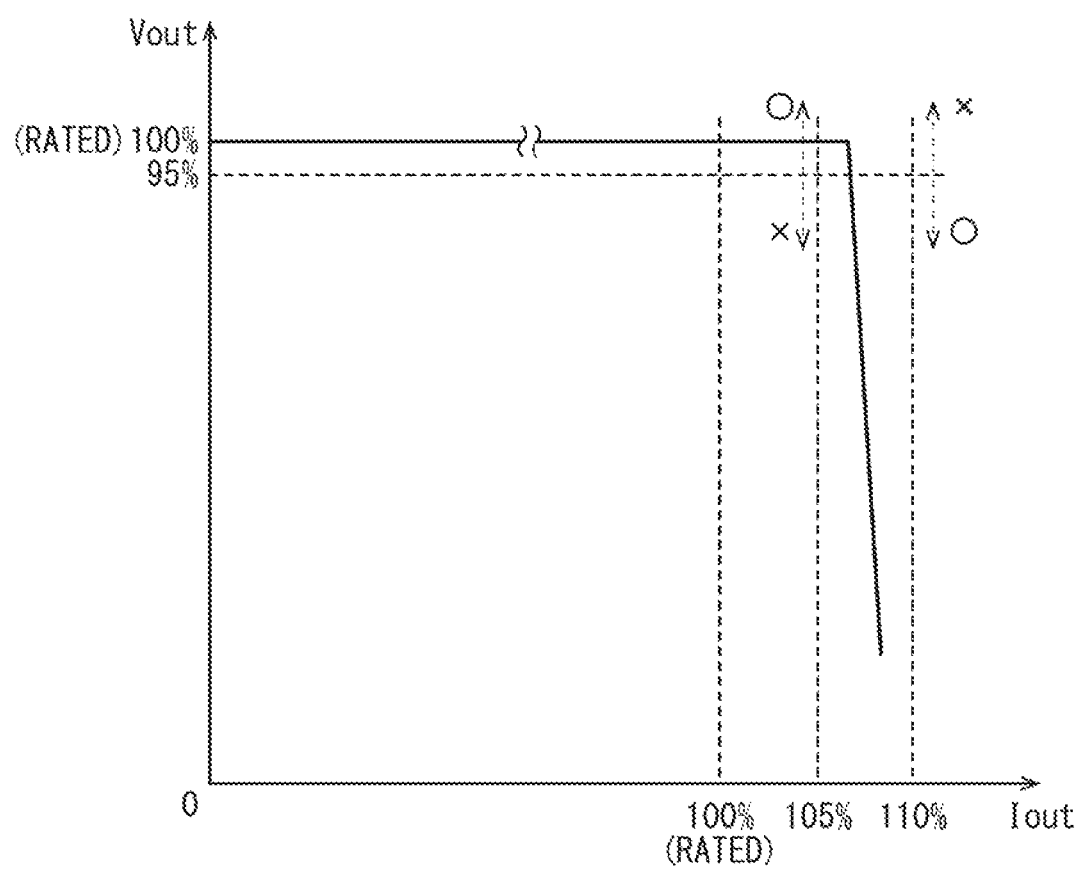

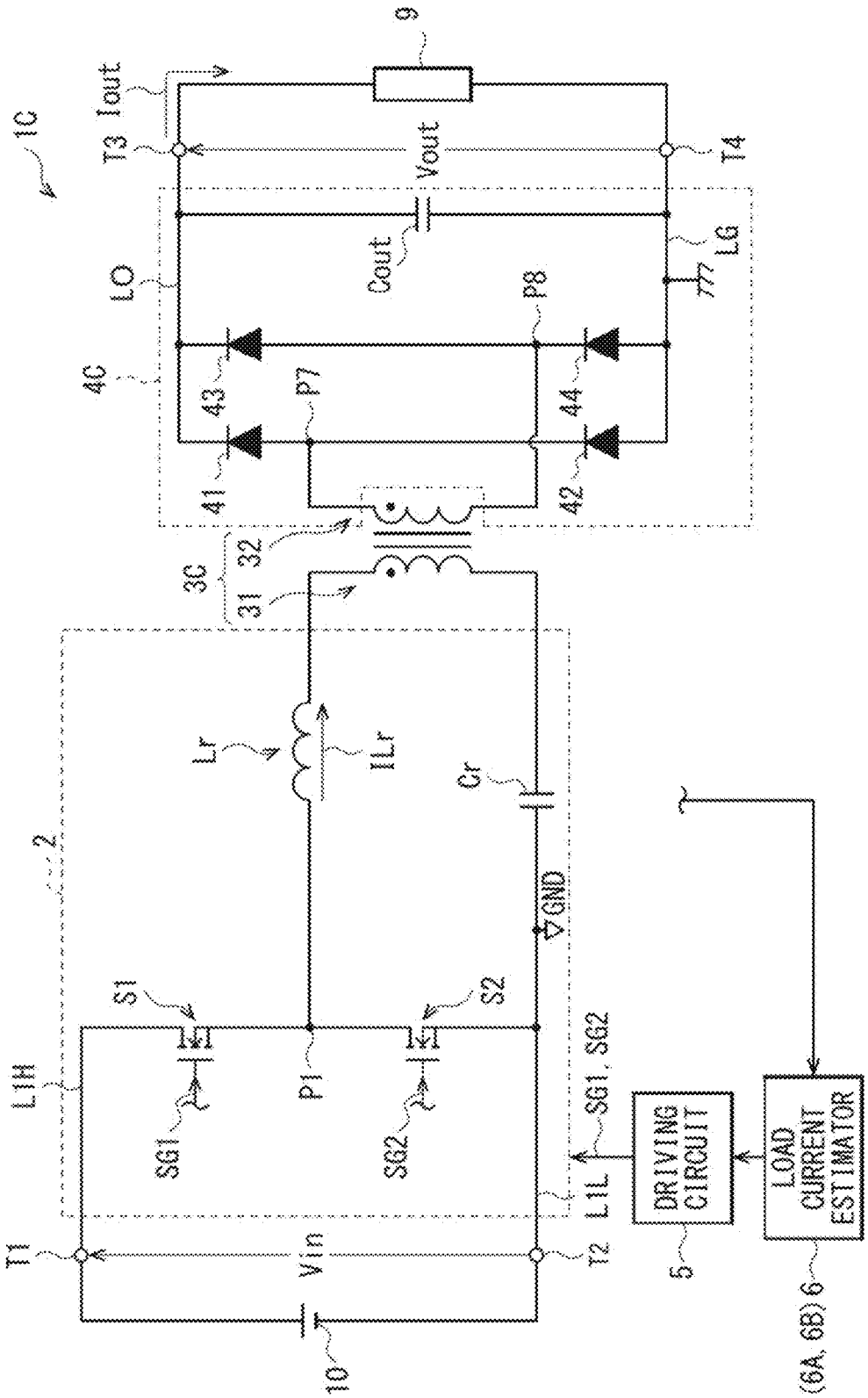
[FIG. 14]

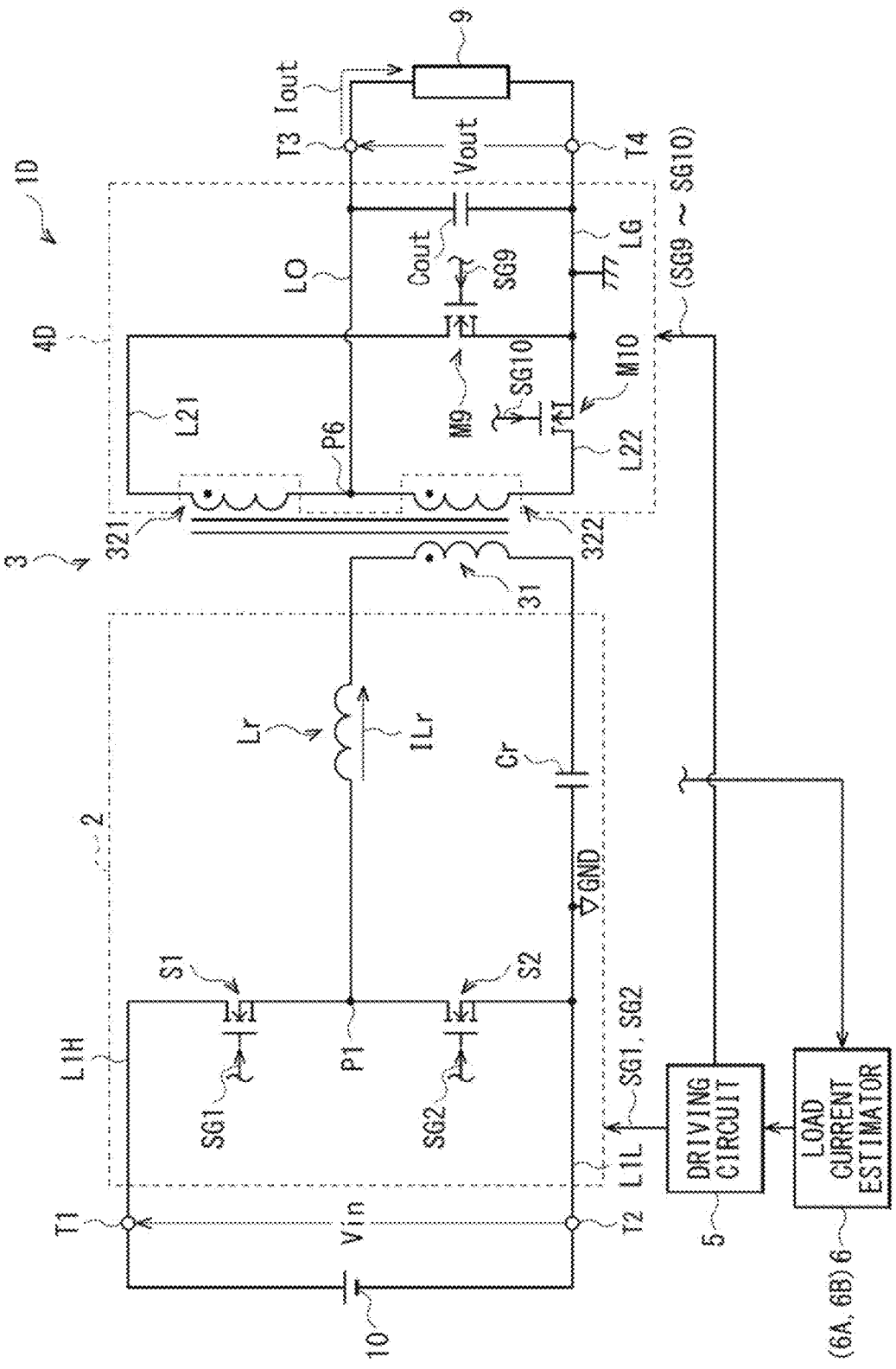
[FIG. 15]

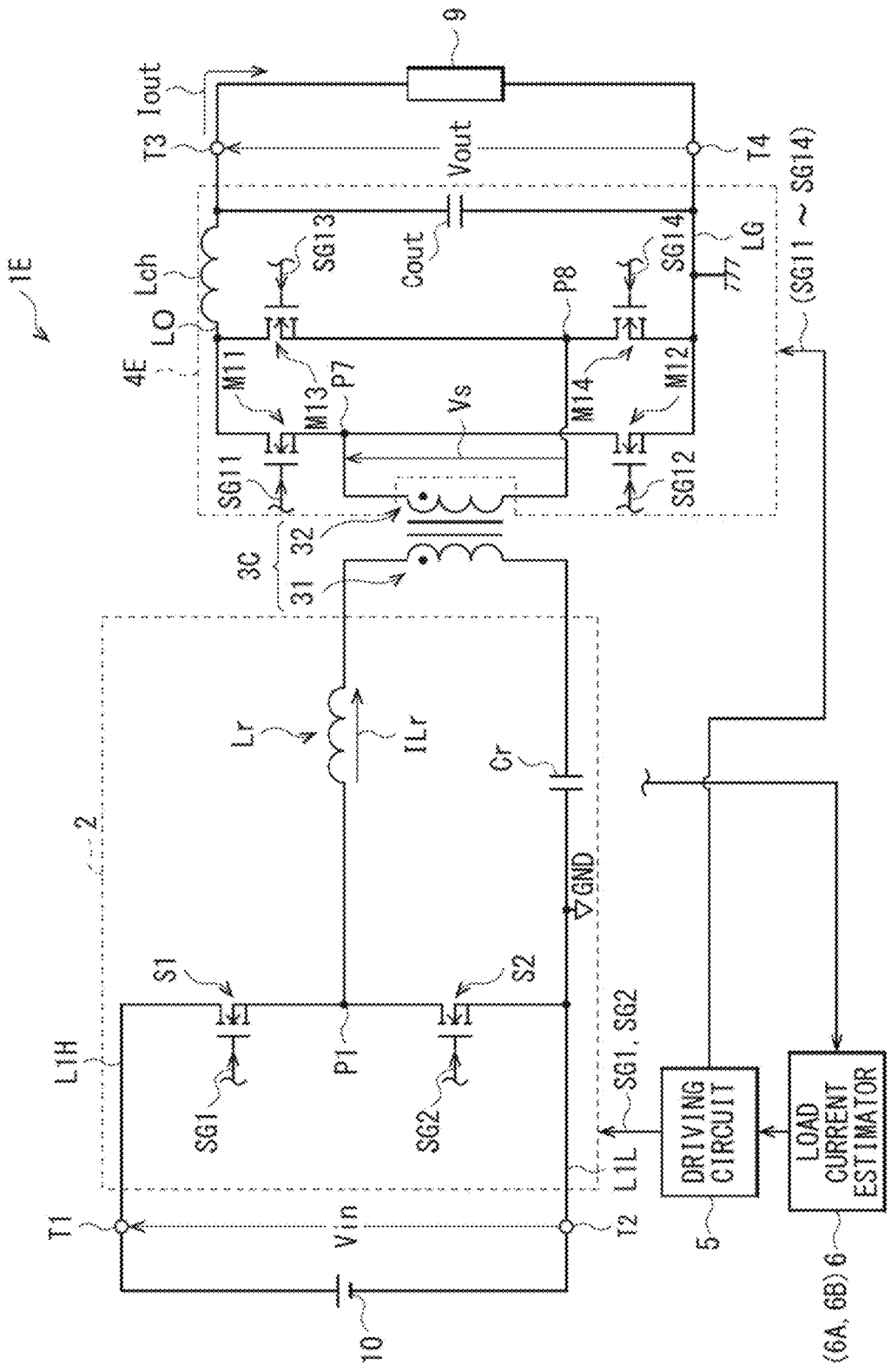
[ FIG. 16 ]

SWITCHING POWER SUPPLY APPARATUS AND ELECTRIC POWER SUPPLY SYSTEM

TECHNICAL FIELD

The disclosure relates to a switching power supply apparatus that performs voltage conversion using switching devices, and to an electric power supply system including such a switching power supply apparatus.

BACKGROUND ART

Various DC-DC converters have been proposed and put into practical use as an example of switching power supply apparatuses (see Patent Literature 1, for example). The DC-DC converter of this kind typically includes an inverter circuit, a power conversion transformer, and a rectifying and smoothing circuit. The inverter circuit includes a switching device.

CITATION LIST

Patent Literature

Patent Literature 1: Japanese Patent No. 6323258

SUMMARY

A switching power supply apparatus according to an example embodiment of the disclosure includes a pair of input terminals, a pair of output terminals, a transformer, an inverter circuit, a rectifying and smoothing circuit, and a controller. The pair of input terminals are configured to receive an input voltage. The pair of output terminals are configured to output an output voltage. The transformer includes a primary winding and a secondary winding. The inverter circuit is disposed between the pair of input terminals and the primary winding, and includes a first switching device, a second switching device, a resonant inductor, and a resonant capacitor. The rectifying and smoothing circuit is disposed between the pair of output terminals and the secondary winding, and includes a rectifying circuit and a smoothing circuit. The rectifying circuit includes two or more rectifying devices. The smoothing circuit includes a smoothing capacitor. The controller is configured to control a switching operation of each of the first switching device and the second switching device in the inverter circuit. The first switching device and the second switching device are coupled in series to each other between a pair of coupling lines, each of the coupling lines being coupled to corresponding one of the pair of input terminals. The resonant inductor, the resonant capacitor, and the primary winding are coupled in series to each other in no particular order between a node between the first and the second switching devices, and one of the pair of input terminals. The controller is configured to control the switching operation on the basis of a voltage across the resonant capacitor and a voltage across the primary winding.

An electric power supply system according to an example embodiment of the disclosure includes a switching power supply apparatus and a power source. The switching power supply apparatus includes a pair of input terminals, a pair of output terminals, a transformer, an inverter circuit, a rectifying and smoothing circuit, and a controller. The pair of input terminals are configured to receive an input voltage. The pair of output terminals are configured to output an output voltage. The transformer includes a primary winding and a secondary winding. The inverter circuit is disposed between the pair of input terminals and the primary winding, and includes a first switching device, a second switching device, a resonant inductor, and a resonant capacitor. The rectifying and smoothing circuit is disposed between the pair of output terminals and the secondary winding, and includes a rectifying circuit and a smoothing circuit. The rectifying circuit includes two or more rectifying devices. The smoothing circuit includes a smoothing capacitor. The controller is configured to control a switching operation of each of the first switching device and the second switching device in the inverter circuit. The first switching device and the second switching device are coupled in series to each other between a pair of coupling lines, each of the coupling lines being coupled to corresponding one of the pair of input terminals. The resonant inductor, the resonant capacitor, and the primary winding are coupled in series to each other in no particular order between a node between the first and the second switching devices, and one of the pair of input terminals. The controller is configured to control the switching operation on the basis of a voltage across the resonant capacitor and a voltage across the primary winding. The power source is configured to supply the input voltage to the pair of input terminals.

BRIEF DESCRIPTION OF THE DRAWINGS

FIG. 1 is a circuit diagram illustrating a schematic configuration example of a switching power supply apparatus according to one example embodiment of the disclosure.

FIG. 2 is a circuit diagram schematically illustrating an equivalent circuit of the switching power supply apparatus illustrated in FIG. 1.

FIG. 3 is a schematic diagram for describing a current phase difference according to the example embodiment.

FIG. 4 is a flowchart illustrating an example technique of estimation of a load current according to the example embodiment.

FIG. 5 is a circuit diagram illustrating a schematic configuration example of a switching power supply apparatus according to one example embodiment of the disclosure.

FIG. 6 is a timing chart illustrating various waveform examples to be used in Technique A according to the example embodiment.

FIG. 7 is a flowchart illustrating an example technique (Technique A) of estimation of the load current according to the example embodiment.

FIG. 8 is a timing chart illustrating various waveform examples to be used in Technique B according to the example embodiment.

FIG. 9 is a schematic diagram for describing positive-negative asymmetry of the waveform example of a transformer excitation current illustrated in FIG. 8.

FIG. 10 is a flowchart illustrating another example technique (Technique B) of estimation of the load current according to the example embodiment.

FIG. 11 is a circuit diagram illustrating a schematic configuration example of a switching power supply apparatus according to Modification Example 1.

FIG. 12 is a flowchart illustrating an example of preliminary correction processing according to Modification Example 1.

FIG. 13 is a schematic diagram for describing the example of the correction processing illustrated in FIG. 12.

FIG. 14 is a circuit diagram illustrating a schematic configuration example of a switching power supply apparatus according to Modification Example 2.

FIG. 15 is a circuit diagram illustrating a schematic configuration example of a switching power supply apparatus according to Modification Example 3.

FIG. 16 is a circuit diagram illustrating a schematic configuration example of a switching power supply apparatus according to Modification Example 4.

DETAILED DESCRIPTION

It is desired in general that a switching power supply apparatus such as a DC-DC converter be downsized.

It is desirable to provide a switching power supply apparatus that makes it possible to achieve downsizing, and to provide an electric power supply system including such a switching power supply apparatus.

Some example embodiments of the disclosure will be described in detail below with reference to the drawings. The description is given in the following order.

1. First Example Embodiment (an example case of estimating a load current with use of a current phase difference)
2. Second Example Embodiment (an example case of estimating the load current with use of a difference in current time product)
3. Modification Examples
    Modification Example 1 (an example case of performing preliminary correction processing on a predetermined parameter)
    Modification Example 2 (an example case of using a bridge rectifying circuit)
    Modification Examples 3 and 4 (example cases of using a synchronous rectifying circuit)
4. Other Modification Examples 1. First Example Embodiment

[Configuration]

FIG. 1 illustrates a schematic configuration example of a switching power supply apparatus (a switching power supply apparatus 1) according to a first example embodiment of the disclosure in a circuit diagram. The switching power supply apparatus 1 serves as a DC-DC converter that performs voltage conversion of a direct-current input voltage Vin supplied from a direct-current input power source 10 (e.g., a battery) into a direct-current output voltage Vout to thereby supply electric power to a load 9. Examples of the load 9 may include electronic equipment and a battery. As described below, the switching power supply apparatus 1 is what is called an "(isolated half-bridge) LLC resonant" DC-DC converter. Note that a mode of the voltage conversion to be performed by the switching power supply apparatus 1 may be either up-conversion (step-up) or down-conversion (step-down).

Here, the direct-current input voltage Vin corresponds to a specific example of an "input voltage" in one embodiment of the disclosure, and the direct-current output voltage Vout corresponds to a specific example of an "output voltage" in one embodiment of the disclosure. The direct-current input power source 10 corresponds to a specific example of a "power source" in one embodiment of the disclosure. A system including the direct-current input power source 10 and the switching power supply apparatus 1 corresponds to a specific example of an "electric power supply system" in one embodiment of the disclosure.

The switching power supply apparatus 1 includes two input terminals T1 and T2, two output terminals T3 and T4, an inverter circuit 2, a transformer 3, a rectifying and smoothing circuit 4, a driving circuit 5, and a load current estimator 6. The direct-current input voltage Vin is inputted to between the input terminals T1 and T2. The direct-current output voltage Vout is outputted from between the output terminals T3 and T4.

Here, the input terminals T1 and T2 correspond to a specific example of a "pair of input terminals" in one embodiment of the disclosure. The output terminals T3 and T4 correspond to a specific example of a "pair of output terminals" in one embodiment of the disclosure.

Note that an input capacitor, for example, may be disposed between a primary high-voltage line L1H coupled to the input terminal T1 and a primary low-voltage line L1L coupled to the input terminal T2. Specifically, at a location between the inverter circuit 2 described below and the input terminals T1 and T2, a first end (one end) of the input capacitor may be coupled to the primary high-voltage line L1H and a second end (another end) of the input capacitor may be coupled to the primary low-voltage line L1L. Such an input capacitor is a capacitor for stabilizing the direct-current input voltage Vin inputted from the input terminals T1 and T2.

(Inverter Circuit 2)

The inverter circuit 2 is disposed between the input terminals T1 and T2 and a primary winding 31 of the transformer 3 to be described later. The inverter circuit 2 includes two switching devices S1 and S2, a resonant inductor Lr, and a resonant capacitor Cr, thus being what is called a "half-bridge" inverter circuit. Note that the resonant inductor Lr may include a leakage inductance of the transformer 3 to be described later, or may be provided independently of such a leakage inductance.

Here, the primary high-voltage line L1H and the primary low-voltage line L1L described above correspond to a specific example of a "pair of coupling lines" in one embodiment of the disclosure. The switching device S1 corresponds to a specific example of a "first switching device" in one embodiment of the disclosure, and the switching device S2 corresponds to a specific example of a "second switching device" in one embodiment of the disclosure.

As the switching devices S1 and S2, for example, switch devices such as field-effect transistors (metal oxide semiconductor-field effect transistors (MOS-FETs)) or insulated gate bipolar transistors (IGBTs) are used. In the example illustrated in FIG. 1, the switching devices S1 and S1 each include a MOS-FET. In a case where MOS-FETs are used as the switching devices S1 and S2 in this way, it is possible for a capacitor and a diode (not illustrated in FIG. 1) that are to be coupled in parallel to each of the switching devices S1 and S2 to respectively include a parasitic capacitance or a parasitic diode of corresponding one of the MOS-FETs.

In the inverter circuit 2, the two switching devices S1 and S2 are coupled in series to each other in this order between the input terminals T1 and T2, i.e., between the primary high-voltage line L1H and the primary low-voltage line L1L. Specifically, the switching device S1 is disposed between the primary high-voltage line L1H and a node P1, and the switching device S2 is disposed between the node P1 and the primary low-voltage line L1L.

Further, the resonant inductor Lr and the resonant capacitor Cr of the inverter circuit 2 and the primary winding 31 of the transformer 3 to be described later are coupled in series to each other between the foregoing node P1 and the primary low-voltage line L1L. Specifically, in the example of FIG. 1, a first end (one end) of the resonant inductor Lr is coupled to the node P1, and a second end (another end) of the resonant inductor Lr is coupled to one end of the foregoing primary winding 31, or a node P3. Further, another end of the primary winding 31 is coupled to a node P2 serving as a first end (one end) of the resonant capacitor Cr, and a second end (another end) of the resonant capacitor Cr is coupled to the primary low-voltage line L1L. Note that as illustrated in FIG. 1, the second end of the resonant capacitor Cr is coupled to a ground GND via the primary low-voltage line L1L.

The node P1 described above corresponds to a specific example of a "node (a node between the first and the second switching devices)" in one embodiment of the disclosure.

With such a configuration, in the inverter circuit 2, the switching devices S1 and S2 perform switching operations (ON and OFF operations) in accordance with respective driving signals SG1 and SG2 supplied from the driving circuit 5 to be described later. As a result, the direct-current input voltage Vin applied to between the input terminals T1 and T2 is converted into an alternating-current voltage, and the alternating-current voltage is outputted to the transformer 3 (the primary winding 31).

(Transformer 3)

The transformer 3 includes the single primary winding 31 and two secondary windings 321 and 322.

In the primary winding 31, the one end of the primary winding 31, or the node P3, is coupled to the other end of the resonant inductor Lr described above, and the other end of the primary winding 31 is coupled to the one end of the resonant capacitor Cr, or the node P2, described above.

In the secondary winding 321, a first end of the secondary winding 321 is coupled to a cathode of a rectifying diode 41 to be described later via a coupling line L21 to be described later, and a second end of the secondary winding 321 is coupled to a center tap P6 in the rectifying and smoothing circuit 4 to be described later. In the secondary winding 322, a first end of the secondary winding 322 is coupled to a cathode of a rectifying diode 42 to be described later via a coupling line L22 to be described later, and a second end of the secondary winding 322 is coupled to the center tap P6 described above. In other words, the respective second ends of the secondary windings 321 and 322 are coupled commonly to the center tap P6.

The transformer 3 performs voltage conversion of a voltage generated by the inverter circuit 2, that is, a voltage in the form of a rectangular pulse wave received at the primary winding 31 of the transformer 3, and outputs an alternating-current voltage from the respective ends of the secondary windings 321 and 322. Note that a degree of the voltage conversion of the direct-current output voltage Vout with respect to the direct-current input voltage Vin in this case depends on a turns ratio between the primary winding 31 and the secondary windings 321 and 322, and a switching frequency fsw to be described later.

(Rectifying and Smoothing Circuit 4)

The rectifying and smoothing circuit 4 includes the two rectifying diodes 41 and 42 and a single output smoothing capacitor Cout. Specifically, the rectifying and smoothing circuit 4 includes a rectifying circuit including the rectifying diodes 41 and 42, and a smoothing circuit including the output smoothing capacitor Cout.

The two rectifying diodes 41 and 42 correspond to a specific example of "two or more rectifying devices" in one embodiment of the disclosure. The output smoothing capacitor Cout corresponds to a specific example of a "smoothing capacitor" in one embodiment of the disclosure.

The rectifying circuit described above includes what is called a "center-tap" rectifying circuit. That is, respective anodes of the rectifying diodes 41 and 42 are coupled to a ground line LG, the cathode of the rectifying diode 41 is coupled to the foregoing first end of the secondary winding 321 via the coupling line L21, and the cathode of the rectifying diode 42 is coupled to the foregoing first end of the secondary winding 322 via the coupling line L22. Further, as described above, the respective second ends of the secondary windings 321 and 322 are coupled commonly to the center tap P6. The center tap P6 is coupled to the output terminal T3 described above via an output line LO. Note that the ground line LG described above is coupled to the output terminal T4 described above.

In the smoothing circuit described above, the output smoothing capacitor Cout is coupled between the output line LO described above and the ground line LG, i.e., between the output terminals T3 and T4. That is, a first end of the output smoothing capacitor Cout is coupled to the output line LO, and a second end of the output smoothing capacitor Cout is coupled to the ground line LG.

In the rectifying and smoothing circuit 4 having such a configuration, the rectifying circuit including the rectifying diodes 41 and 42 rectifies the alternating-current voltage outputted from the transformer 3, and outputs the rectified voltage. Further, the smoothing circuit including the output smoothing capacitor Cout smooths the voltage rectified by the foregoing rectifying circuit to thereby generate the direct-current output voltage Vout. The direct-current output voltage Vout generated in this way causes a load current Iout (a direct-current output current) to flow into the load 9 described above, thus causing electric power to be supplied to the load 9 from the output terminals T3 and T4 (see FIG. 1).

(Driving Circuit 5)

The driving circuit 5 is a circuit that performs switching driving to control the respective operations of the switching devices S1 and S2 in the inverter circuit 2. Specifically, the driving circuit 5 controls the switching operations, i.e., the ON and OFF operations, of each of the switching devices S1 and S2 by supplying the switching devices S1 and S2 with the respective driving signals SG1 and SG2 independently of each other.

Here, the driving circuit 5 performs frequency control in controlling the switching operations of each of the switching devices S1 and S2, that is, in performing the switching driving on each of the switching devices S1 and S2. That is, the driving circuit 5 performs pulse frequency modulation (PFM) control on the driving signals SG1 and SG2.

Further, the driving circuit 5 performs the above-described switching driving to cause the switching devices S1 and S2 to operate with respective fixed duty ratios while the switching frequency fsw of each of the switching devices S1 and S2 varies. In this connection, if respective ON periods of the switching devices S1 and S2 are denoted as Ton1 and Ton2, the respective duty ratios of the switching devices S1 and S2 described above are expressed as (Ton1/Tsw) and (Ton2/Tsw) with use of a switching cycle Tsw, where the switching cycle Tsw=(1/fsw).

Moreover, although details will be described later, the driving circuit 5 performs switching driving with use of an estimated value of the load current Iout, i.e., a load current estimate Iout(est) to be described later, determined by a load current estimator 6 to be described later. Specifically, by performing such switching driving with use of the load current estimate Iout(est), the driving circuit 5 controls a value of the load current Iout to fall within an appropriate range.

(Load Current Estimator 6)

The load current estimator 6 performs estimation of the foregoing load current Iout, that is, determines the load current estimate Iout(est) by a technique to be described later. Specifically, although details will be described later, the load current estimator 6 determines a primary-side conversion value IoutAC of the load current Iout on the basis of a resonant inductor current ILr flowing through the resonant inductor Lr and a transformer excitation current Im flowing through the primary winding 31. The load current estimator 6 then determines the load current estimate Iout(est) on the basis of the primary-side conversion value IoutAC.

Further, in the present example embodiment, in particular, although details will be described later, the load current estimator 6 determines the load current estimate Iout(est) with use of a current phase difference φ1 between the resonant inductor current ILr and the transformer excitation current Im. Specifically, the load current estimator 6 determines the current phase difference φ1 on the basis of a voltage Vcr across the resonant capacitor Cr and a voltage Vnp across the primary winding 31 which will be described below.

In the example illustrated in FIG. 1, the load current estimator 6 includes two detectors 61 and 62 and a controller 60.

The detector 61 is a circuit that detects the voltage Vcr across the resonant capacitor Cr (i.e., between the node P2 and the primary low-voltage line L1L in a case where the second end of the resonant capacitor Cr is coupled to the ground GND common to the detector 61 as illustrated in FIG. 1). Although details will be described later, the detector 61 further performs a predetermined calculation process on the basis of the voltage Vcr thus detected.

The detector 62 is a circuit that detects the voltage Vnp across the primary winding 31 (i.e., between the nodes P2 and P3 illustrated in FIG. 1). Although details will be described later, the detector 62 further performs a predetermined calculation process on the basis of the voltage Vnp thus detected.

The controller 60 is a circuit that determines the load current estimate Iout(est) by a predetermined calculation process to be described later on the basis of a result of the foregoing calculation process performed at each of the detectors 61 and 62. The controller 60 also controls the switching driving to be performed by the driving circuit 5, that is, controls the switching operations of each of the switching devices S1 and S2, with use of the load current estimate Iout(est) thus determined. Specifically, although details will be described later, the controller 60 controls the switching operations on the basis of the foregoing voltage Vcr across the resonant capacitor Cr and the foregoing voltage Vnp across the primary winding 31. The value of the load current Iout is thereby controlled to fall within the appropriate range, as described above.

[Operations, Workings, and Effects]

(A. Basic Operation)

In the switching power supply apparatus 1, the direct-current input voltage Vin supplied from the direct-current input power source 10 via the input terminals T1 and T2 is switched by the switching devices S1 and S2 at the inverter circuit 2 to generate a voltage in the form of a rectangular pulse wave. The voltage in the form of a rectangular pulse wave is supplied to the primary winding 31 of the transformer 3 and is transformed by the transformer 3. Thus, an alternating-current voltage resulting from the transformation is outputted from the secondary windings 321 and 322.

In the rectifying and smoothing circuit 4, the alternating-current voltage outputted from the transformer 3, i.e., the alternating-current voltage resulting from the transformation described above, is rectified by the rectifying diodes 41 and 42 in the rectifying circuit, and is thereafter smoothed by the output smoothing capacitor Cout in the smoothing circuit. The direct-current output voltage Vout is thus outputted from the output terminals T3 and T4. The direct-current output voltage Vout causes the load current Iout to flow into the load 9, and causes electric power to be supplied to the load 9.

(B. Operation of Estimating Load Current Iout)

Next, with reference to FIGS. 2 to 4 in addition to FIG. 1, a detailed description will be given of an operation of estimating the load current Iout described above, that is, an operation of deriving the load current estimate Iout(est) described above, to be performed by the load current estimator 6.

(B-1. Outline of Estimation Operation)

FIG. 2 is a circuit diagram schematically illustrating an equivalent circuit of the switching power supply apparatus 1 illustrated in FIG. 1, or an equivalent circuit of the LLC resonant converter described above. Note that in FIG. 2, VinAC represents an alternating-current input voltage, Lm represents an excitation inductance value of the transformer 3, RL(AC) represents a primary load, and n represents the turns ratio between the primary winding 31 and the secondary windings 321 and 322, that is, np/ns where np represents the number of turns of the primary winding 31, and np represents the number of turns of the secondary windings 321 and 322. Further, a resistance value of the primary load RL(AC) is expressed as $(8 \cdot n^2 \cdot RL)/\pi^2$, using the foregoing turns ratio n and a resistance value RL of the load 9. Note that such a technique is called a first harmonic approximation (FHA), which is an approximate analysis technique with attention focused only on a fundamental frequency of a rectangular-wave voltage.

As illustrated in FIG. 2, the foregoing resonant inductor current ILr divides into the foregoing transformer excitation current Im and the foregoing primary-side conversion value IoutAC of the load current Iout. Thus, it is possible for the load current Iout flowing on a secondary side (see FIG. 1) to be estimated on a primary side by determining the primary-side conversion value IoutAC of the load current Iout from a difference (=ILr−Im) between the resonant inductor current ILr and the transformer excitation current Im.

FIG. 3 is a schematic diagram for describing the foregoing current phase difference φ1 according to the present example embodiment. In an example of FIG. 3, as indicated by reference signs in parentheses, the resonant inductor current ILr, the transformer excitation current Im, and the primary-side conversion value IoutAC of the load current Iout described above are respectively replaced with three currents i1, i2, and i (=i1−i2) each having a sinusoidal waveform. Further, FIG. 3 also illustrates the current phase difference φ1 between the current i1 (the resonant inductor current ILr) and the current i2 (the transformer excitation current Im) and a current phase difference φ3 between the current i2 and the current i (the primary-side conversion value IoutAC of the load current Tout).

In this case, if the currents i1 and i2 in FIG. 3 are respectively defined by Equations (1) and (2) below, the current i (=i1−i2) is given by Equations (3) to (8) below.

$$i1 = Im1 \cdot \sin(\omega t + \phi 1) = Im1 \cdot \sin \omega t \cdot \cos \phi 1 + Im1 \cdot \cos \omega t \cdot \sin \phi 1 \quad (1); \text{ and}$$

$$i2 = Im2 \cdot \sin \omega t \quad (2)$$

where Im1 and Im2 represent amplitude values, ω represents angular frequency, and t represents time.

$$i( = i1 - i2) = A \cdot \sin\omega t + B \cdot \cos\omega t \quad (3)$$

$$= (A^2 + B^2)^{1/2} \cdot \sin(\omega t + \phi 3) \quad (4)$$

$$A = Im1 \cdot \cos\phi 1 - Im2 \quad (5)$$

$$B = Im1 \cdot \sin\phi 1 \quad (6)$$

$$(A^2 + B^2)^{1/2} = (Im1^2 + Im2^2 - 2 \cdot Im1 \cdot Im2 \cdot \cos\phi 1)^{1/2} \quad (7)$$

$$\phi 3 = \tan^{-1}(B/A) \quad (8)$$

Further, if the currents i1, i2, and I are respectively replaced with the resonant inductor current ILr, the transformer excitation current Im, and the primary-side conversion value IoutAC of the load current Iout as described above using Equations (3) to (8), then a peak value ILr(peak) of the resonant inductor current ILr, a peak value Im(peak) of the transformer excitation current Im, and a peak value IoutAC(peak) of the primary-side conversion value IoutAC of the load current Iout are respectively given by Equations (9) to (12) below (see also each parameter in FIG. 2).

$$ILr(peak) = \omega \cdot Cr \cdot Vcr(peak) \quad (9)$$

where Cr represents a capacitance value of the resonant capacitor Cr, and Vcr(peak) represents a peak value of the voltage Vcr.

$$Im(peak) = VoutAC/(\omega \cdot Lm) \quad (10)$$

$$= (4 \cdot n \cdot Vout)/(\pi \cdot \omega \cdot Lm)$$

$$VoutAc = (4/\pi) \cdot n \cdot Vout \cdot \sin\omega t \quad (11)$$

$$Iout(peak) = \quad (12)$$
$$\{ILr(peak)^2 + Im(peak)^2 - 2 \cdot ILr(peak) \cdot Im(peak) \cdot \cos\phi 1\}^{1/2}$$

Thus, according to the technique of estimating the load current Iout of the present example embodiment to be described below, such a calculation technique is used to perform estimation of the load current Iout.

(B-2. Details of Estimation Operation)

FIG. 4 illustrates an example technique of estimation of the load current Iout by the load current estimator 6 according to the present example embodiment in a flowchart.

In this example technique of estimation, first, on the basis of the voltage Vcr (see FIG. 1) across the resonant capacitor Cr detected as described above, the detector 61 determines each of ILr(peak) described above and a zero cross point of the voltage Vcr (step S11 in FIG. 4). Specifically, the detector 61 determines ILr(peak) from Equation (9) above, on the basis of the voltage Vcr.

Next, on the basis of the voltage Vnp (see FIG. 1: corresponding to VoutAC in FIG. 2) across the primary winding 31 detected as described above, the detector 62 determines each of Im(peak) and a zero cross point of the voltage Vnp (step S12). Specifically, the detector 62 determines Im(peak) from Equations (10) and (11) above, on the basis of the voltage Vnp.

Next, on the basis of the respective zero cross points of the voltages Vcr and Vnp determined by the detectors 61 and 62, the controller 60 determines the current phase difference φ1 (see FIG. 3) between the resonant inductor current ILr and the transformer excitation current Im (step S13). Specifically, the controller 60 determines the current phase difference φ1 from a difference between the zero cross points of these currents.

Next, on the basis of ILr(peak), Im(peak), and φ1 thus determined, the controller 60 determines the peak value (IoutAC(peak)) of the primary-side conversion value IoutAC of the load current Iout (step S14) from Equation (12) above.

On the basis of IoutAC(peak) thus determined, the controller 60 determines an estimated value of the load current Iout, i.e., the load current estimate Iout(est) (step S15). Specifically, the controller 60 determines the load current estimate Iout(est) by determining an average of the peak values IoutAC(peak) from Equation (13) below.

$$Iout(est) = n \cdot (2/\pi) \cdot IoutAC(peak) \quad (13)$$

The process of the technique of estimating the load current Iout illustrated in FIG. 4 thus ends.

(C. Workings and Effects)

To achieve a constant current drooping characteristic for overcurrent protection regarding the load current, it is typically necessary for an LLC resonant switching power supply apparatus to accurately detect the value of the load current.

However, in a case of detecting the load current with use of, for example, a current sensor such as a resistor, efficiency of the switching power supply apparatus is reduced due to an electric power loss occurring at the resistor, which results in an increase in size of the switching power supply apparatus. Further, in a case where it is intended that load current control be performed on the primary side of the switching power supply apparatus on the basis of a result of detection of the load current, the following issue can result. That is, in such a case, it is necessary to provide a device for transmitting a detection value of the load current (i.e., the result of detection obtained on the secondary side) to the primary side in an isolated condition. An example of such a device is an isolation amplifier. The number of components of the switching power supply apparatus thus increases to make the switching power supply apparatus larger in size, as is the case described above. Note that in this case, a photocoupler is not usable for transmission because what is to be transmitted is a detection value of a current. It can thus be said that it is difficult for the typical LLC resonant switching power supply apparatus to achieve downsizing while meeting the demand for accurate detection of the value of the load current.

In contrast, according to the switching power supply apparatus 1 of the present example embodiment, the controller 60 of the load current estimator 6 controls the switching operations on the basis of the foregoing voltage Vcr across the resonant capacitor Cr and the foregoing voltage Vnp across the primary winding 31. The present example embodiment thus makes it possible to achieve downsizing of the switching power supply apparatus 1, as compared with the case of the foregoing typical LLC resonant switching power supply apparatus, for example. Specifically, in the present example embodiment, the load current estimator 6 determines the primary-side conversion value IoutAC of the load current Iout on the basis of the resonant inductor current ILr and the transformer excitation current Im, and determines the load current estimate Iout (est) on the basis of the primary-side conversion value IoutAC. The controller 60 controls the value of the load current Iout by performing switching control with use of the load current estimate Iout(est) thus determined.

Accordingly, in the present example embodiment, unlike in the case of the foregoing typical LLC resonant switching power supply apparatus, the load current estimate Iout(est) is determined on the basis of the primary-side conversion value IoutAC of the load current Iout that is obtained on the primary side without using any current sensor such as a resistor, and the value of the load current Iout is controlled on the basis of the load current estimate Iout(est). As a result, the present example embodiment avoids an electric power loss that would occur in the case of detecting the load current Iout with use of, for example, a resistor as described above, and also allows a reduction in the number of components by obviating the use of a device for transmitting the detection value of the load current Iout to the primary side in an isolated condition.

Note that, by way of example, it was possible to estimate the load current Iout with an error of about 10[%] or less with the switching power supply apparatus 1 where the direct-current input voltage Vin was 200 to 400 [V], the direct-current output voltage was 48 [V], and a rated current was 21 [A].

For reasons described above, the present example embodiment makes it possible to achieve downsizing of the switching power supply apparatus 1 as compared with the foregoing typical LLC resonant switching power supply apparatus.

Further, it is possible for the switching power supply apparatus 1 to achieve also cost reduction and improved reliability, owing to the avoidance of the electric power loss that would occur in the case of detecting the load current Iout with use of, for example, a resistor, as described above. Moreover, as described above, the number of components is reduced because it is unnecessary to provide any device for transmitting the detection value of the load current Tout to the primary side in an isolated condition. In this respect also, it is possible for the switching power supply apparatus 1 to achieve cost reduction and improved reliability.

Further, in the present example embodiment, the load current estimate Iout(est) is determined with use of the current phase difference 41 between the resonant inductor current ILr and the transformer excitation current Im. This allows easy estimation of the load current Iout.

Further, in the present example embodiment, the current phase difference ϕ1 is determined on the basis of the voltage Vcr across the resonant capacitor Cr and the voltage Vnp across the primary winding 31. This allows easier estimation of the load current Iout.

In addition, in the present example embodiment, the resonant inductor Lr in the inverter circuit 2 may include a leakage inductance of the transformer 3. In such a case, it becomes unnecessary to separately provide the resonant inductor Lr, and it is thus possible to reduce the number of components. As a result, it is possible for the switching power supply apparatus 1 to achieve further downsizing and further cost reduction.

Further, in the present example embodiment, the switching devices S1 and S2 in the inverter circuit 2 each include a MOS-FET. This makes it possible to raise the switching frequency fsw, thus making it possible to achieve a reduction in component size.

Further, in the present example embodiment, the rectifying circuit in the rectifying and smoothing circuit 4 includes what is called the "center-tap" rectifying circuit. Accordingly, for example, as compared with a case of using what is called a "bridge" rectifying circuit as in Modification Example 2 to be described later, the number of the rectifying devices is reduced to two (the rectifying diodes 41 and 42), and consequently, it is possible to achieve reductions in size, loss, and cost of the rectifying circuit.

2. Second Example Embodiment

Next, a second example embodiment of the disclosure will be described. Note that in the following, the same reference signs are assigned to components the same as those in the foregoing first example embodiment, and descriptions thereof are omitted as appropriate.
[Configuration]
FIG. 5 illustrates a schematic configuration example of a switching power supply apparatus (a switching power supply apparatus 1A) according to the second example embodiment in a circuit diagram.

Note that, as with the first example embodiment, a system including the direct-current input power source 10 and the switching power supply apparatus 1A corresponds to a specific example of the "electric power supply system" in one embodiment of the disclosure.

The switching power supply apparatus 1A of the second example embodiment corresponds to the switching power supply apparatus 1 of the first example embodiment in which the load current estimator 6 is replaced with a load current estimator 6A described below, with the remainder of configuration being unchanged.
(Load Current Estimator 6A)

Like the load current estimator 6, the load current estimator 6A performs estimation of the load current Iout, that is, determines the load current estimate Iout(est). Further, like the load current estimator 6, the load current estimator 6A also determines the primary-side conversion value IoutAC of the load current Iout on the basis of the resonant inductor current ILr and the transformer excitation current Im. The load current estimator 6 then determines the load current estimate Iout(est) on the basis of the primary-side conversion value IoutAC, like the load current estimator 6.

Further, in the present example embodiment, in particular, although details will be described later, the load current estimator 6A determines the load current estimate Iout(est) with use of a difference in current time product between the resonant inductor current ILr and the transformer excitation current Im. The current time product is an integrated value of the current along a time axis, and corresponds to the amount of electric charge. Moreover, although details will be described later, the load current estimator 6A alters such a method of estimation of the load current Iout with use of the difference in current time product, in accordance with a magnitude relationship between the switching frequency fsw of the switching devices S1 and S2 and a resonant frequency fr in resonance operation performed with use of the resonant inductor Lr and the resonant capacitor Cr.

In the example illustrated in FIG. 5, the load current estimator 6A includes three detectors 61A, 62A, and 63A, and a controller 60A.

The detector 61A is a circuit that detects the voltage Vcr across the resonant capacitor Cr, like the detector 61. Although details will be described later, the detector 61A further performs a predetermined calculation process on the basis of the voltage Vcr thus detected.

The detector 62A is a circuit that detects the voltage Vnp across the primary winding 31, like the detector 62. Although details will be described later, the detector 62A further performs a predetermined calculation process on the basis of the voltage Vnp thus detected.

The detector 63A is a circuit that detects a switching voltage Vsw corresponding to a potential at the node P1.

Although details will be described later, the detector 63A further performs a predetermined calculation process on the basis of the switching voltage Vsw thus detected. Note that in the example illustrated in FIG. 5, the detector 63A is coupled to the ground (the ground GND) common to the detector 61A and a second-end side of the resonant capacitor Cr. Further, although the detector 63A is disposed between the primary low-voltage line L1L and the node P1 in the example illustrated in FIG. 5, the detector 63A may be disposed between the primary high-voltage line L1H and the node P1, for example.

The controller 60A is a circuit that determines the load current estimate Iout(est) by a predetermined calculation process to be described later on the basis of a result of the foregoing calculation process performed at the each of detectors 61A, 62A, and 63A. Further, on the basis of the load current estimate Iout(est) thus determined, the controller 60A controls the switching driving to be performed by the driving circuit 5, like the controller 60. As a result, the value of the load current Iout is controlled to fall within the appropriate range by the driving circuit 5, as described above.

[Operations, Workings, and Effects]
(A. Operation of Estimating Load Current Iout)

Next, with reference to FIGS. 6 to 10 in addition to FIG. 5, a detailed description will be given of an operation of estimating the load current Iout (an operation of deriving the load current estimate Iout(est)) to be performed by the load current estimator 6A. Specifically, in the following, a detailed description will be given separately of an estimation technique (Technique A) to be employed in a case where the foregoing switching frequency fsw is higher than the foregoing resonant frequency fr (fsw>fr) and an estimation technique (Technique B) to be employed in a case where, contrary to the above, the switching frequency fsw is lower than the resonant frequency fr (fsw<fr).

Note that a case where fsw>fr and where switching cycle Tsw (=1/fsw)<resonance cycle Tr (=1/fr) corresponds to a case of an operation mode where the primary-side conversion value IoutAC of the load current Iout is continuous (along the time axis). In contrast, a case where fsw<fr and where Tsw>Tr corresponds to a case of an operation mode where the primary-side conversion value IoutAC of the load current Iout is discontinuous (along the time axis).

(A-1. Technique A: Case Where fsw>fr)

FIG. 6 illustrates various waveform examples to be used in the foregoing Technique A (the technique to be employed in the case where fsw>fr) according to the present example embodiment in a timing chart. Specifically, part (A) of FIG. 6 illustrates a waveform example of the voltage Vnp, part (B) of FIG. 6 illustrates a waveform example of the primary-side conversion value IoutAC (=ILr−Im) of the load current Iout, part (C) of FIG. 6 illustrates waveform examples of the resonant inductor current ILr and the transformer excitation current Im, and part (D) of FIG. 6 illustrates a waveform example of the voltage Vcr. Note that the horizontal axis represents time t, and this also applies to subsequent timing charts.

FIG. 7 illustrates an example technique (Technique A described above) of estimation of the load current Iout by the load current estimator 6A according to the present example embodiment in a flowchart.

According to Technique A (in the case where fsw>fr), first, the load current estimator 6A performs estimation of the load current Iout with use of the difference in current time product described above on the basis of the voltage Vcr across the resonant capacitor Cr and the voltage Vnp across the primary winding 31, as described below. That is, according to Technique A, the load current estimator 6A uses only detection results obtained by the detectors 61A and 62A described above, and does not use any detection result obtained by the detector 63A.

Specifically, according to Technique A, first, on the basis of the voltage Vcr (see FIG. 5 and part (D) of FIG. 6) detected as described above, the detector 61A determines each of the resonant inductor current ILr and a zero cross point of the resonant inductor current ILr (step S21 of FIG. 7). Specifically, the detector 61A determines the resonant inductor current ILr by performing a differential operation on the voltage Vcr.

Next, on the basis of the voltage Vnp (see FIG. 5 and part (A) of FIG. 6) detected as described above, the detector 62A determines each of a variation amount ΔIm (see part (C) of FIG. 6) of the transformer excitation current Im and the zero cross point of the voltage Vnp (step S22). Specifically, the detector 62A determines ΔIm from Equation (14) below, on the basis of the voltage Vnp.

$$\Delta Im = (Vnp \cdot Tsw)/(4 \cdot Lm) \qquad (14)$$

where Tsw represents the switching cycle (see FIG. 6), and Lm represents the excitation inductance value of the transformer 3.

Next, on the basis of the respective zero cross points of the resonant inductor current ILr and the voltage Vnp determined by the detectors 61A and 62A, the controller 60A determines a delay time ΔT1 (see part (C) of FIG. 6) (step S23). Specifically, as illustrated in FIG. 6, the controller 60A determines the delay time ΔT1 from a time difference between the respective zero cross points of the resonant inductor current ILr and the voltage Vnp.

Next, the controller 60A determines a current time product (a+b) of the primary-side conversion value IoutAC (=ILr−Im) of the load current Iout with use of the difference in current time product between the resonant inductor current ILr and the transformer excitation current Im (step S24, see part (B) of FIG. 6). Specifically, the controller 60A determines the current time product (a+b) from Equation (15) below, on the basis of the variation amount ΔIm of the transformer excitation current Im and the delay time ΔT1 described above. Note that a current time product a and a current time product b are each as illustrated in part (C) of FIG. 6.

$$(a+b) = (Cr \cdot \Delta Vcr) - (\Delta Im \cdot \Delta T1) \qquad (15)$$

where Cr represents the capacitance value of the resonant capacitor Cr, and ΔVcr represents a difference between a maximum value and a minimum value of the voltage Vcr (see part (D) of FIG. 6).

On the basis of the current time product (a+b) of the primary-side conversion value IoutAC of the load current Iout thus determined, the controller 60A determines the load current estimate Iout(est) (step S25). Specifically, the controller 60A determines the load current estimate Iout(est) from Equation (16) below.

$$Iout(est) = (n \cdot (a+b))/(Tsw/2) \qquad (16)$$

where n=np/ns, which is the turns ratio between the primary winding 31 and the secondary windings 321 and 322.

The process of the technique of estimating the load current Iout illustrated in FIG. 7 (Technique A described above) thus ends.

(A-2. Technique B: Case Where fsw<fr)

FIG. 8 illustrates various waveform examples to be used in the foregoing Technique B (the technique to be employed in the case where fsw<fr) according to the present example embodiment in a timing chart. Specifically, part (A) of FIG. 8 illustrates a waveform example of the switching voltage Vsw, part (B) of FIG. 8 illustrates a waveform example of the voltage Vnp, part (C) of FIG. 8 illustrates a waveform example of the primary-side conversion value IoutAC of the load current Iout, part (D) of FIG. 8 illustrates waveform examples of the resonant inductor current ILr and the transformer excitation current Im, and part (E) of FIG. 8 illustrates a waveform example of the voltage Vcr.

FIG. 9 is a schematic diagram for describing positive-negative asymmetry (asymmetry of positive and negative values) of the waveform example of the transformer excitation current Im illustrated in FIG. 8. T3 in FIG. 9 represents delay time. Specifically, to describe a waveform alteration (adjustment of an approximate waveform) for compensating for the positive-negative asymmetry, the transformer excitation current Im before the waveform alteration (in a broken line) and the transformer excitation current Im after the waveform alteration (in a solid line) are each illustrated in FIG. 9 (and part (D) of FIG. 8).

Thus, according to Technique B (in the case where fsw<fr), the load current estimator 6A performs estimation of the load current Iout, taking into account of the positive-negative asymmetry of the transformer excitation current Im. Specifically, in the case where fsw<fr, as seen from integrated values Sa and Sb (Sa≠Sb) illustrated in FIG. 9, for example, positive values and negative values of the transformer excitation current Im are asymmetric, unlike in the case where fsw>fr. In a case where the transformer excitation current Im has such positive-negative asymmetry, it is difficult for the positive and negative values to cancel each other out, and accordingly, it is difficult to perform separation processing on the load current Iout even by performing an integration operation on the detection value. To cope with this, according to Technique B, as described above, the waveform alteration (adjustment of the approximate waveform) is applied to the transformer excitation current Im for compensating for the positive-negative asymmetry (see an arrow for Im illustrated in part (D) of FIG. 8 and in FIG. 9).

FIG. 10 illustrates an example technique (Technique B described above) of estimation of the load current Iout by the load current estimator 6A according to the present example embodiment in a flowchart.

According to Technique B (in the case where fsw<fr), first, the load current estimator 6A performs estimation of the load current Iout with use of the difference in current time product described above on the basis of the foregoing voltages Vcr and Vnp and also the foregoing switching voltage Vsw, as described below. That is, according to Technique B, the load current estimator 6A uses the respective detection results obtained by the detectors 61A, 62A, and 63A described above, unlike in the case with Technique A described above.

Specifically, according to Technique B, first, the process of step S21 is performed in a manner similar to that in the case with Technique A described above. That is, on the basis of the voltage Vcr (see FIG. 5 and part (E) of FIG. 8) detected as described above, the detector 61A determines each of the resonant inductor current ILr and the zero cross point of the resonant inductor current ILr (step S21 in FIG. 10). Specifically, the detector 61A determines the resonant inductor current ILr by performing the differential operation on the voltage Vcr.

Next, on the basis of the voltage Vnp (see FIG. 5 and part (B) of FIG. 8) detected as described above, the detector 62A determines the variation amount ΔIm (see part (D) of FIG. 8) of the transformer excitation current Im (step S32). Specifically, the detector 62A determines the variation amount ΔIm from Equation (17) below, on the basis of the voltage Vnp.

$$\Delta Im = (Vnp \cdot Tr)/(4 \cdot Lm) \qquad (17)$$

where Tr represents the resonance cycle (=1/fr, see FIGS. 8 and 9).

Next, on the basis of the switching voltage Vsw (see FIG. 5 and part (A) of FIG. 8) detected as described above, the detector 63A determines a zero cross point of the switching voltage Vsw (step S33).

Next, on the basis of the respective zero cross points of the resonant inductor current ILr and the switching voltage Vsw determined by the detectors 61A and 63A, the controller 60A determines a delay time ΔT2 (see part (D) of FIG. 8) (step S34). Specifically, as illustrated in FIG. 8, the controller 60A determines the delay time ΔT2 from a time difference between the respective zero cross points of the resonant inductor current ILr and the switching voltage Vsw.

Next, the controller 60A determines the current time product (a+b) of the primary-side conversion value IoutAC (=ILr−Im) of the load current Iout with use of the difference in current time product between the resonant inductor current ILr and the transformer excitation current Im (step S35, see part (C) of FIG. 8). Specifically, the controller 60A determines the current time product (a+b) from Equations (18) and (19) below, on the basis of the variation amount ΔIm of the transformer excitation current Im and the delay time ΔT2 described above.

$$(a+b) = Cr \cdot (\Delta Vcr - 2 \cdot \Delta Vcr1) - (\Delta Im \cdot Tsw - Im2 \cdot Tr)/2 \qquad (18)$$

$$= Cr \cdot \Delta Vcr - (\Delta Im \cdot Tsw)/2 + Im2 \cdot (Tr - 2 \cdot \Delta T2)/2; \text{ and}$$

$$Im2 = (2 \cdot Cr \cdot \Delta Vcr1)/\Delta T2 \qquad (19)$$

where ΔVcr1 represents a variation amount of the voltage Vcr during the delay time ΔT2 (see part (E) of FIG. 8).

On the basis of the current time product (a+b) of the primary-side conversion value IoutAC of the load current Iout thus determined, the controller 60A determines the load current estimate Iout(est) (step S36). Specifically, the controller 60A determines the load current estimate Iout(est) from Equation (20) below.

$$Iout(est) = (n(a+b))/(Tsw/2) \qquad (20)$$

The process of the technique of estimating the load current Iout illustrated in FIG. 10 (Technique B described above) thus ends.

(B. Workings and Effects)

Basically, such a switching power supply apparatus 1A of the present example embodiment is also able to provide effects similar to those of the switching power supply apparatus 1 of the first example embodiment, through similar workings.

Further, in the present example embodiment, in particular, the load current estimate Iout(est) is determined with use of the difference in current time product between the resonant inductor current ILr and the transformer excitation current Im. This allows easy estimation of the load current Iout.

Moreover, in the present example embodiment, the method of estimation of the load current Iout with use of the difference in current time product is altered in accordance with the magnitude relationship between the switching frequency fsw and the resonant frequency fr. Specifically, in the case where the switching frequency fsw is higher than the resonant frequency fr, the load current estimator 6A performs estimation of the load current Iout with use of the difference in current time product on the basis of the voltage Vcr across the resonant capacitor Cr and the voltage Vnp across the primary winding 31. Further, in the case where, contrary to the above, the switching frequency fsw is lower than the resonant frequency fr, the load current estimator 6A performs estimation of the load current Iout with use of the difference in current time product on the basis of the voltages Vcr and Vnp and the switching voltage Vsw described above. Thus, according to the present example embodiment, an appropriate estimation method is selectable in accordance with the magnitude relationship between the foregoing frequencies. This makes it possible to improve accuracy of estimation of the load current Iout.

In addition, according to the present example embodiment, in the case where the switching frequency fsw is lower than the resonant frequency fr, the estimation of the load current Iout with use of the difference in current time product is performed with the asymmetry of the positive and negative values of the transformer excitation current Im taken into account. This makes it possible to estimate the load current Iout with high accuracy even in the case where fsw<fr, that is, in the case of the operation mode where the primary-side conversion value IoutAC of the load current Iout is discontinuous, as described above. Accordingly, it is possible to further improve the accuracy of estimation of the load current Iout.

Note that according to the present example embodiment, by way of example, it was possible to estimate the load current Iout with errors of the following degrees.

In the case where fsw>fr (the case of the operation mode where the primary-side conversion value IoutAC of the load current Iout is continuous): an error of about 5[%] or less In the case where fsw<fr (the case of the operation mode where the primary-side conversion value IoutAC of the load current Iout is discontinuous): an error of about 10[%] or less 3. Modification Examples Next, a description will be given of modification examples (Modification Examples 1 to 4) of the first and second example embodiments described so far. Note that in the following, the same reference signs are assigned to components the same as those in the first or second example embodiment, and descriptions thereof are omitted as appropriate.

Modification Example 1

(Configuration)

FIG. 11 illustrates a schematic configuration example of a switching power supply apparatus (a switching power supply apparatus 1B) according to Modification Example 1 in a circuit diagram.

Note that, as with the first and second example embodiments, a system including the direct-current input power source 10 and the switching power supply apparatus 1B corresponds to a specific example of the "electric power supply system" in one embodiment of the disclosure.

The switching power supply apparatus 1B of Modification Example 1 corresponds to the switching power supply apparatus 1 or 1A of the first or second example embodiment in which the load current estimator 6 or 6A is replaced with a load current estimator 6B described below, with the remainder of configuration being unchanged.

The load current estimator 6B performs estimation of the load current Iout basically in like manner with the load current estimator 6 or 6A described so far. However, as described below, the load current estimator 6B performs estimation of the load current Iout further with use of a predetermined parameter that is corrected in advance, or preliminarily, in accordance with a measurement value of a correspondence relationship between the load current Iout and the direct-current output voltage Vout, that is, an output characteristic. The predetermined parameter will be described later.

Such preliminary correction processing on the predetermined parameter is performed in advance at the time of, for example, an inspection of the switching power supply apparatus 1B to be conducted at a timing such as before shipment as a product. In other words, the predetermined parameter is set to a value having subjected to such preliminary correction processing, that is, a value finely adjusted by calculation. A reason for this is that the estimated value of the load current Iout (the load current estimate Iout(est)) can vary due to a factor such as individual variations of each device in the switching power supply apparatus 1B. Note that examples of the foregoing predetermined parameter may include the capacitance value of the resonant capacitor Cr, the excitation inductance value Lm of the transformer 3, and a detection value at the load current estimator 6B (each of the detectors 61, 62, 61A, 62A, and 63A described above).

FIG. 12 illustrates an example of the foregoing preliminary correction processing according to Modification Example 1 in a flowchart. FIG. 13 is a schematic diagram for describing the example of the correction processing illustrated in FIG. 12. Specifically, FIG. 13 illustrates an example of the output characteristic (the correspondence relationship between the load current Iout and the direct-current output voltage Vout under an overcurrent drooping condition) of the switching power supply apparatus 1B, with a rated current and a rated voltage each taken as 100%.

In this example of the correction processing, first, the direct-current output voltage Vout is measured with the load current Iout set to 105%, i.e., 105% of the rated current (see FIG. 13) (step S41 in FIG. 12). Thereafter, it is determined whether the direct-current output voltage Vout measured under such a condition is greater than or equal to 95% of the rated voltage (Vout≥95%) (step S42). If Vout is greater than or equal to 95%, (step S42: Y, see a mark "○" at a point where Iout=105% in FIG. 13), the flow proceeds to step S44 to be described later.

In contrast, if Vout is less than 95% (step S42: N, see a mark "x" at a point where Iout=105% in FIG. 13), a correction to decrease the load current estimate Iout(est) is performed (step S43). Specifically, a correction to decrease the foregoing predetermined parameter (any of parameters including, for example, the capacitance value of the resonant capacitor Cr and the excitation inductance value Lm of the transformer 3) is performed. Note that after this step S43, the flow returns to step S41 described above.

Next, in step S44 described above, the direct-current output voltage Vout is measured with the load current Iout set to 110%, i.e., 110% of the rated current (see FIG. 13). Thereafter, it is determined whether the direct-current output voltage Vout measured under such a condition is less than 95% of the rated voltage (Vout<95%) (step S45). If Vout is less than 95%, (step S45: Y, see a mark "○" at a point where Iout=110% in FIG. 13), a series of correction processes illustrated in FIG. 12 ends.

In contrast, if Vout is greater than or equal to 95% (step S45: N, see a mark "x" at a point where Iout=110% in FIG. 13), a correction to increase the load current estimate Iout(est) is performed (step S46). Specifically, a correction to increase the foregoing predetermined parameter (any of parameters including, for example, the capacitance value of the resonant capacitor Cr and the excitation inductance value Lm of the transformer 3) is performed. Note that after this step S46, the flow returns to step S44 described above.

(Workings and Effects)

Basically, such a switching power supply apparatus 1B of Modification Example 1 is also able to provide effects similar to those of the switching power supply apparatus 1 or 1A of the first or second example embodiment, through similar workings.

Further, in Modification Example 1, in particular, estimation of the load current Iout is performed with use of the predetermined parameter that is corrected in advance in accordance with the measurement value of the correspondence relationship between the load current Iout and the direct-current output voltage Vout. Such preliminary correction is performed at the time of, for example, an inspection of the switching power supply apparatus 1B to be conducted at a timing such as before shipment as a product. This makes it possible to suppress variations of the estimated value of the load current Tout that can be caused by a factor such as individual variations of each device in advance, and thus makes it possible to improve manufacturing yields. As a result, it is also possible to achieve further cost reduction of the switching power supply apparatus 1B.

Modification Example 2

(Configuration)

FIG. 14 illustrates a schematic configuration example of a switching power supply apparatus (a switching power supply apparatus 1C) according to Modification Example 2 in a circuit diagram.

Note that, as with the first and second example embodiments, a system including the direct-current input power source 10 and the switching power supply apparatus 1C corresponds to a specific example of the "electric power supply system" in one embodiment of the disclosure.

The switching power supply apparatus 1C of Modification Example 2 corresponds to any of the switching power supply apparatuses 1, 1A, and 1B described so far in which the transformer 3 and the rectifying and smoothing circuit 4 are replaced with a transformer 3C and a rectifying and smoothing circuit 4C, respectively, with the remainder of configuration being unchanged.

The transformer 3C includes the single primary winding 31 and a single secondary winding 32. That is, the transformer 3 is provided with the two secondary windings 321 and 322, whereas the transformer 3C is provided with the single secondary winding 32 only. The secondary winding 32 has a first end coupled to a node P7 in the rectifying and smoothing circuit 4C to be described later, and a second end coupled to a node P8 in the rectifying and smoothing circuit 4C.

Like the transformer 3, the transformer 3C also performs voltage conversion of a voltage generated by the inverter circuit 2, that is, a voltage in the form of a rectangular pulse wave, and outputs an alternating-current voltage from the end of the secondary winding 32. Note that the degree of the voltage conversion of the direct-current output voltage Vout with respect to the direct-current input voltage Vin in this case depends on the turns ratio between the primary winding 31 and the secondary winding 32, and the switching frequency fsw described above.

The rectifying and smoothing circuit 4C includes four rectifying diodes 41 to 44 and the single output smoothing capacitor Cout. Specifically, the rectifying and smoothing circuit 4C includes a rectifying circuit including the rectifying diodes 41 to 44, and the smoothing circuit including the output smoothing capacitor Cout. That is, the rectifying and smoothing circuit 4C corresponds to the rectifying and smoothing circuit 4 in which the configuration of the rectifying circuit is changed.

Note that the four rectifying diodes 41 to 44 correspond to a specific example of the "two or more rectifying devices" in one embodiment of the disclosure.

The rectifying circuit of Modification Example 2 includes what is called a "bridge" rectifying circuit, unlike the rectifying circuits of the first and second example embodiments and Modification Example 1, i.e., what is called the "center-tap" rectifying circuits. That is, the cathode of the rectifying diode 41 and a cathode of the rectifying diode 43 are each coupled to the output line LO, and the anode of the rectifying diode 41 is coupled to the cathode of the rectifying diode 42 and the foregoing first end of the secondary winding 32 at the node P7. Further, the anode of the rectifying diode 42 and an anode of the rectifying diode 44 are each coupled to the ground line LG, and a cathode of the rectifying diode 44 is coupled to an anode of the rectifying diode 43 and the foregoing second end of the secondary winding 32 at the node P8.

In the rectifying and smoothing circuit 4C having such a configuration, the rectifying circuit including the rectifying diodes 41 to 44 rectifies the alternating-current voltage outputted from the transformer 3C and outputs the rectified voltage, in a manner similar to that in the rectifying and smoothing circuit 4.

(Workings and Effects)

Basically, the switching power supply apparatus 1C of Modification Example 2 having such a configuration is also able to provide effects similar to those of the switching power supply apparatuses 1, 1A, and 1B described so far, through similar workings.

Further, in Modification Example 2, in particular, the bridge rectifying circuit is employed as the rectifying circuit in the rectifying and smoothing circuit 4C. Accordingly, the number of the windings, or the number of the secondary windings, in the transformer 3C is reduced to one (the secondary winding 32), as compared with the first and second example embodiments and Modification Example 1, for example. As a result, it is possible to achieve downsizing and a reduction in loss of the transformer 3C.

Modification Examples 3 and 4

(Configuration)

Switching power supply apparatuses (switching power supply apparatuses 1D and 1E) according to Modification Examples 3 and 4 differ from the foregoing first and second example embodiments and Modification Examples 1 and 2 described so far in that what is called a synchronous rectifying circuit is employed as the rectifying circuit in each of the rectifying and smoothing circuits 4 and 4C, as described below.

Specifically, FIG. 15 illustrates a schematic configuration example of the switching power supply apparatus (the switching power supply apparatus 1D) according to Modification Example 3 in a circuit diagram.

The switching power supply apparatus 1D of Modification Example 3 corresponds to any of the switching power supply apparatuses 1, 1A, and 1B of the first and second example embodiments and Modification Example 1 in which the rectifying and smoothing circuit 4 is replaced with a rectifying and smoothing circuit 4D, with the remainder of configuration being unchanged.

In the synchronous rectifying circuit (the rectifying and smoothing circuit 4D) of Modification Example 3, as illustrated in FIG. 15, the foregoing rectifying diodes 41 and 42 include respective MOS-FETs (MOS transistors M9 and M10) serving as switching devices. Further, in this synchronous rectifying circuit, the MOS transistors M9 and M10 are controlled to perform synchronous rectification, that is, controlled so that the MOS transistors M9 and M10 themselves come into an ON state in synchronization with periods during which respective parasitic diodes of the MOS transistors M9 and M10 are conducting. Specifically, the driving circuit 5 of Modification Example 3 controls ON and OFF operations of the MOS transistors M9 and M10 with use of respective driving signals SG9 and SG10 (see FIG. 15).

Further, FIG. 16 illustrates a schematic configuration example of the switching power supply apparatus (the switching power supply apparatus 1E) according to Modification Example 4 in a circuit diagram.

The switching power supply apparatus 1E of Modification Example 4 corresponds to the switching power supply apparatus 1C of Modification Example 2 in which the rectifying and smoothing circuit 4C is replaced with a rectifying and smoothing circuit 4E, with the remainder of configuration being unchanged.

In the synchronous rectifying circuit (the rectifying and smoothing circuit 4E) of Modification Example 4, as illustrated in FIG. 16, the rectifying diodes 41 to 44 described in Modification Example 2 include respective MOS-FETs (MOS transistors M11 to M14) serving as switching devices. Further, in the synchronous rectifying circuit of Modification Example 4 also, as in the synchronous rectifying circuit of Modification Example 3 described above, the MOS transistors M11 to M14 are controlled to perform synchronous rectification, that is, controlled so that the MOS transistors M11 to M14 themselves come into an ON state in synchronization with periods during which respective parasitic diodes of the MOS transistors M11 to M14 are conducting. Specifically, the driving circuit 5 of Modification Example 4 controls ON and OFF operations of the MOS transistors M11 to M14 with use of respective driving signals SG11 to SG14 (see FIG. 16).

Note that, as with the first and second example embodiments, a system including the direct-current input power source 10 and the switching power supply apparatus 1D or the switching power supply apparatus 1E corresponds to a specific example of the "electric power supply system" in one embodiment of the disclosure.

(Workings and Effects)

Basically, the switching power supply apparatuses 1D and 1E of Modification Examples 3 and 4 having such configurations are also able to provide effects similar to those of the switching power supply apparatuses 1, 1A, 1B, and 1C described so far, through similar workings.

Further, in each of Modification Examples 3 and 4, in particular, the two or more rectifying devices in the rectifying circuit each include the switching device, and the rectifying circuit includes the synchronous rectifying circuit. Thus, a conduction loss occurring upon rectification is reduced by such a synchronous rectifying circuit. Accordingly, it is possible for the rectifying circuit to achieve downsizing and a reduction in loss. Examples of such a switching device include, in addition to the foregoing MOS-FET, a high electron mobility transistor (HEMT), i.e., a heterostructure field-effect transistor (HFET), and an IGBT with a diode added thereto in parallel or a bipolar transistor with a diode added thereto in parallel.

4. Other Modification Examples

The disclosure has been described above with reference to the example embodiments and the modification examples. However, embodiments of the disclosure are not limited thereto, and may be modified in a variety of ways.

For example, although specific configurations of the inverter circuit have been described in the foregoing example embodiments, etc., the configurations described in the foregoing example embodiments, etc. are non-limiting examples, and any other configuration may be employed for the inverter circuit, for example. Specifically, for example, regarding how the resonant inductor Lr, the resonant capacitor Cr, and the primary winding 31 coupled in series to each other are arranged with respect to each other, the arrangement relationship described in the example embodiments, etc. is non-limiting. Thus, the resonant inductor Lr, the resonant capacitor Cr, and the primary winding 31 may be arranged in no particular order with respect to each other. Further, although an example case where the resonant inductor Lr, the resonant capacitor Cr, and the primary winding 31 are each disposed between the node P1 and the primary low-voltage line L1L (the input terminal T2) has been described in the foregoing example embodiments, etc., this is a non-limiting example. That is, the resonant inductor Lr, the resonant capacitor Cr, and the primary winding 31 may each be disposed between the node P1 and the primary high-voltage line L1H (the input terminal T1), for example.

Further, although specific configurations of the transformer (the primary winding and the secondary winding) have been described in the foregoing example embodiments, etc., the configurations described in the foregoing example embodiments, etc. are non-limiting examples, and any other configuration may be employed for the transformer (the primary winding and the secondary winding), for example.

Furthermore, although specific configurations of the rectifying and smoothing circuit (the rectifying circuit and the smoothing circuit) have been described in the foregoing example embodiments, etc., the configurations described in the foregoing example embodiments, etc. are non-limiting examples, and any other configuration may be employed for the rectifying and smoothing circuit (the rectifying circuit and the smoothing circuit), for example.

In addition, although the description has been given of the specific techniques by which the driving circuit performs operation control (switching driving) on each of the switching devices in the foregoing example embodiments, etc., the techniques described in the foregoing example embodiments, etc. are non-limiting examples, and any other technique may be employed for the switching driving. Further, techniques of estimating the foregoing load current Iout are not limited to those described in the foregoing example embodiments, etc., and any other technique may be used. Furthermore, although specific configurations of the load current estimator (the detectors and the controller) have been described in the foregoing example embodiments, etc., the configurations described in the foregoing example embodifiguration may be employed for the load current estimator (the detectors and the controller).

Further, although the DC-DC converter has been described in the foregoing example embodiments, etc. as an example of the switching power supply apparatus according to the disclosure, any embodiment of the disclosure is applicable to any other kind of switching power supply apparatus, such as an AC-DC converter.

Moreover, any two or more of the configuration examples and other examples described so far may be combined and applied in a desired manner.

Embodiments of the disclosure may be configured as follows.

(1)
A switching power supply apparatus including:
a pair of input terminals configured to receive an input voltage;
a pair of output terminals configured to output an output voltage;
a transformer including a primary winding and a secondary winding;
an inverter circuit disposed between the pair of input terminals and the primary winding, and including a first switching device, a second switching device, a resonant inductor, and a resonant capacitor;
a rectifying and smoothing circuit disposed between the pair of output terminals and the secondary winding, and including a rectifying circuit and a smoothing circuit, the rectifying circuit including two or more rectifying devices, the smoothing circuit including a smoothing capacitor; and
a controller configured to control a switching operation of each of the first switching device and the second switching device in the inverter circuit, in which
the first switching device and the second switching device are coupled in series to each other between a pair of coupling lines, each of the coupling lines being coupled to corresponding one of the pair of input terminals,
the resonant inductor, the resonant capacitor, and the primary winding are coupled in series to each other in no particular order between a node between the first and the second switching devices, and one of the pair of input terminals, and
the controller is configured to control the switching operation on the basis of a voltage across the resonant capacitor and a voltage across the primary winding.

(2)
The switching power supply apparatus according to (1), further including a load current estimator that includes the controller and is configured to perform estimation of a load current flowing through a load to be supplied with electric power by the output voltage,
the load current estimator is configured to:
determine a primary-side conversion value of the load current on the basis of a resonant inductor current flowing through the resonant inductor and a transformer excitation current flowing through the primary winding; and
determine an estimated value of the load current on the basis of the primary-side conversion value of the load current, and
the controller is configured to control a value of the load current by performing control on the switching operation with use of the estimated value of the load current.

(3)
The switching power supply apparatus according to (2), in which the load current estimator is configured to determine the estimated value of the load current with use of a current phase difference between the resonant inductor current and the transformer excitation current.

(4)
The switching power supply apparatus according to (3), in which the load current estimator is configured to determine the current phase difference on the basis of the voltage across the resonant capacitor and the voltage across the primary winding.

(5)
The switching power supply apparatus according to (2), in which the load current estimator is configured to determine the estimated value of the load current with use of a difference in current time product between the resonant inductor current and the transformer excitation current.

(6)
The switching power supply apparatus according to (5), in which the load current estimator is configured to alter a method of the estimation of the load current with use of the difference in the current time product, in accordance with a magnitude relationship between:
a switching frequency of the first switching device and the second switching device; and
a resonant frequency in a resonance operation performed with use of the resonant inductor and the resonant capacitor.

(7)
The switching power supply apparatus according to (6), in which
the load current estimator is configured to:
perform, in a case where the switching frequency is higher than the resonant frequency, the estimation of the load current with use of the difference in the current time product on the basis of the voltage across the resonant capacitor and the voltage across the primary winding; and
perform, in a case where the switching frequency is lower than the resonant frequency, the estimation of the load current with use of the difference in the current time product on the basis of the voltage across the resonant capacitor, the voltage across the primary winding, and a switching voltage corresponding to a potential at the node.

(8)
The switching power supply apparatus according to (6) or (7), in which the load current estimator is configured to perform, in a case where the switching frequency is lower than the resonant frequency, the estimation of the load current with use of the difference in the current time product, taking asymmetry of positive and negative values of the transformer excitation current into account.

(9)
The switching power supply apparatus according to any one of (2) to (8), in which the load current estimator is configured to perform the estimation of the load current with use of a predetermined parameter that is corrected in advance in accordance with a measurement value of a correspondence relationship between the load current and the output voltage.

(10)
The switching power supply apparatus according to (9), in which the predetermined parameter includes a capacitance value of the resonant capacitor, an excitation inductance value of the transformer, or a detection value at the load current estimator.

(11)

The switching power supply apparatus according to any one of (1) to (10), in which the resonant inductor includes a leakage inductance of the transformer.

(12)

The switching power supply apparatus according to any one of (1) to (11), in which the first switching device and the second switching device each include a metal-oxide-semiconductor field-effect transistor.

(13)

The switching power supply apparatus according to any one of (1) to (12), in which the rectifying circuit includes a center-tap rectifying circuit.

(14)

The switching power supply apparatus according to any one of (1) to (12), in which the rectifying circuit includes a bridge rectifying circuit.

(15)

The switching power supply apparatus according to any one of (1) to (14), in which the two or more rectifying devices each include a switching device, and the rectifying circuit includes a synchronous rectifying circuit.

(16)

An electric power supply system including:
  the switching power supply apparatus according to any one of (1) to (15); and
  a power source configured to supply the input voltage to the pair of input terminals.

The switching power supply apparatus according to at least one embodiment of the disclosure and the electric power supply system according to at least one embodiment of the disclosure each make it possible to achieve downsizing.

The invention claimed is:

1. A switching power supply apparatus comprising:
  a pair of input terminals configured to receive an input voltage;
  a pair of output terminals configured to output an output voltage;
  a transformer including a primary winding and a secondary winding;
  an inverter circuit disposed between the pair of input terminals and the primary winding, and including a first switching device, a second switching device, a resonant inductor, and a resonant capacitor;
  a rectifying and smoothing circuit disposed between the pair of output terminals and the secondary winding, and including a rectifying circuit and a smoothing circuit, the rectifying circuit including two or more rectifying devices, the smoothing circuit including a smoothing capacitor;
  a controller configured to control a switching operation of each of the first switching device and the second switching device in the inverter circuit; and
  a load current estimator that includes the controller and is configured to perform estimation of a load current flowing through a load to be supplied with electric power by the output voltage, wherein
  the first switching device and the second switching device are coupled in series to each other between a pair of coupling lines, each of the coupling lines being coupled to corresponding one of the pair of input terminals,
  the resonant inductor, the resonant capacitor, and the primary winding are coupled in series to each other in no particular order between a node between the first and the second switching devices, and one of the pair of input terminals, the controller is configured to control the switching operation on a basis of a voltage across the resonant capacitor and a voltage across the primary winding,
the load current estimator is configured to:
  determine a primary-side conversion value of the load current on a basis of a resonant inductor current flowing through the resonant inductor and a transformer excitation current flowing through the primary winding; and
  determine an estimated value of the load current on a basis of the primary-side conversion value of the load current, and
the controller is configured to control a value of the load current by performing control on the switching operation with use of the estimated value of the load current.

2. The switching power supply apparatus according to claim 1, wherein the load current estimator is configured to determine the estimated value of the load current with use of a current phase difference between the resonant inductor current and the transformer excitation current.

3. The switching power supply apparatus according to claim 2, wherein the load current estimator is configured to determine the current phase difference on the basis of the voltage across the resonant capacitor and the voltage across the primary winding.

4. The switching power supply apparatus according to claim 1, wherein the load current estimator is configured to determine the estimated value of the load current with use of a difference in current time product between the resonant inductor current and the transformer excitation current.

5. The switching power supply apparatus according to claim 4, wherein the load current estimator is configured to alter a method of the estimation of the load current with use of the difference in the current time product, in accordance with a magnitude relationship between:
  a switching frequency of the first switching device and the second switching device; and
  a resonant frequency in a resonance operation performed with use of the resonant inductor and the resonant capacitor.

6. The switching power supply apparatus according to claim 5, wherein
the load current estimator is configured to:
  perform, in a case where the switching frequency is higher than the resonant frequency, the estimation of the load current with use of the difference in the current time product on the basis of the voltage across the resonant capacitor and the voltage across the primary winding; and
  perform, in a case where the switching frequency is lower than the resonant frequency, the estimation of the load current with use of the difference in the current time product on a basis of the voltage across the resonant capacitor, the voltage across the primary winding, and a switching voltage corresponding to a potential at the node.

7. The switching power supply apparatus according to claim 5, wherein the load current estimator is configured to perform, in a case where the switching frequency is lower than the resonant frequency, the estimation of the load current with use of the difference in the current time product, taking asymmetry of positive and negative values of the transformer excitation current into account.

8. The switching power supply apparatus according to claim 1, wherein the load current estimator is configured to perform the estimation of the load current with use of a predetermined parameter that is corrected in advance in accordance with a measurement value of a correspondence relationship between the load current and the output voltage.

9. The switching power supply apparatus according to claim 8, wherein the predetermined parameter comprises a capacitance value of the resonant capacitor, an excitation inductance value of the transformer, or a detection value at the load current estimator.

10. The switching power supply apparatus according to claim 1, wherein the resonant inductor includes a leakage inductance of the transformer.

11. The switching power supply apparatus according to claim 1, wherein the first switching device and the second switching device each include a metal-oxide-semiconductor field-effect transistor.

12. The switching power supply apparatus according to claim 1, wherein the rectifying circuit comprises a center-tap rectifying circuit.

13. The switching power supply apparatus according to claim 1, wherein the rectifying circuit comprises a bridge rectifying circuit.

14. The switching power supply apparatus according to claim 1, wherein the two or more rectifying devices each include a switching device, and the rectifying circuit comprises a synchronous rectifying circuit.

15. An electric power supply system comprising:
   the switching power supply apparatus according to claim 1; and
   a power source configured to supply the input voltage to the pair of input terminals.

* * * * *